(12) United States Patent
Sharma et al.

(10) Patent No.: US 11,055,923 B2
(45) Date of Patent: Jul. 6, 2021

(54) SYSTEM AND METHOD FOR HEAD MOUNTED DEVICE INPUT

(71) Applicants: Priyanka Sharma, Cupertino, CA (US); Andrew R McHugh, San Jose, CA (US)

(72) Inventors: Priyanka Sharma, Cupertino, CA (US); Andrew R McHugh, San Jose, CA (US)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 16/565,607

(22) Filed: Sep. 10, 2019

(65) Prior Publication Data

US 2020/0202629 A1 Jun. 25, 2020

Related U.S. Application Data

(60) Provisional application No. 62/782,146, filed on Dec. 19, 2018.

(51) Int. Cl.
| | |
|---|---|
| *G06T 19/00* | (2011.01) |
| *G02B 27/01* | (2006.01) |
| *G02B 27/00* | (2006.01) |
| *G06F 3/048* | (2013.01) |
| *G06F 3/01* | (2006.01) |

(52) U.S. Cl.
CPC ........ *G06T 19/006* (2013.01); *G02B 27/0093* (2013.01); *G02B 27/0172* (2013.01); *G06F 3/012* (2013.01); *G06F 3/048* (2013.01)

(58) Field of Classification Search
CPC .............. G06T 19/006; G02B 27/0093; G02B 27/0172; G06F 3/012; G06F 3/048
See application file for complete search history.

(56) References Cited

U.S. PATENT DOCUMENTS

| | | | |
|---|---|---|---|
| 9,219,901 B2 | 12/2015 | Mulholland et al. | |
| 9,485,837 B2 | 11/2016 | Van De Sluis et al. | |
| 9,857,886 B2 | 1/2018 | Kuriya et al. | |
| 10,112,111 B2 | 10/2018 | Marks et al. | |
| 2007/0222746 A1 | 9/2007 | Le Vine | |
| 2012/0188148 A1 | 7/2012 | DeJong | |
| 2017/0205892 A1* | 7/2017 | Petrovskaya | G06T 19/006 |
| 2017/0266554 A1* | 9/2017 | Marks | A63F 13/5255 |
| 2017/0322622 A1 | 11/2017 | Hong et al. | |
| 2018/0046431 A1 | 2/2018 | Thagadur et al. | |
| 2018/0210204 A1 | 7/2018 | takano et al. | |
| 2018/0224928 A1 | 8/2018 | Ross et al. | |

FOREIGN PATENT DOCUMENTS

| | | |
|---|---|---|
| JP | 2016-24751 | 2/2016 |
| WO | 2016168893 | 10/2016 |

* cited by examiner

*Primary Examiner* — Chong Wu
(74) *Attorney, Agent, or Firm* — John J. King

(57) ABSTRACT

According to one implementation, a head mounted display (HMD) device comprises a motion detector, a display, and a processor coupled to the motion detector and the display. A memory is also coupled to the processor, wherein the memory stores executable instructions that cause the processor to define an available range for a motion and output a graphic user interface for the available range on the display. An input based upon a motion of the HMD device detected by the inertial motion unit, within the available range is received. One of the HMD device or an external device may then be controlled in response to the input.

20 Claims, 15 Drawing Sheets

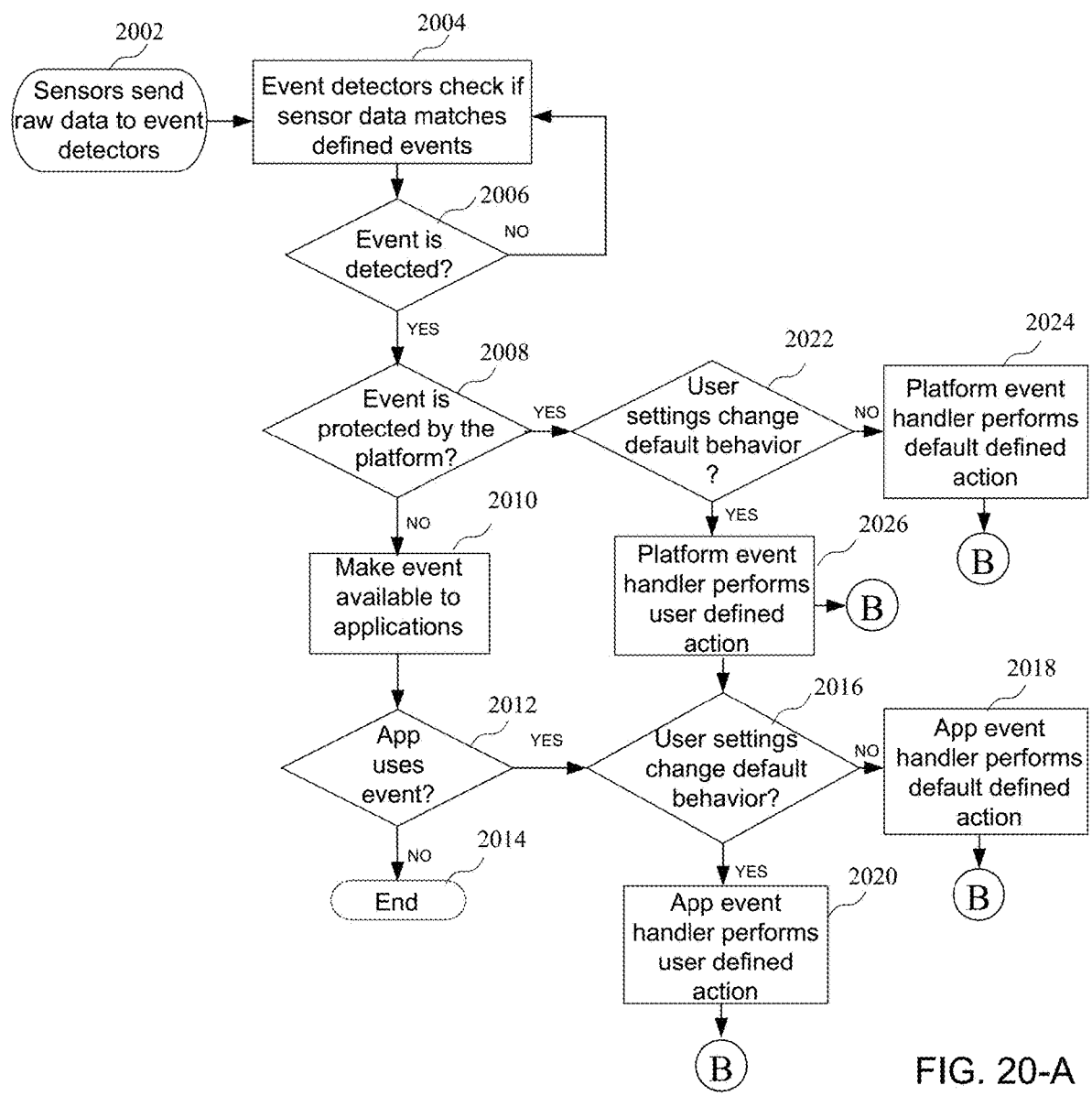
FIG. 20-A

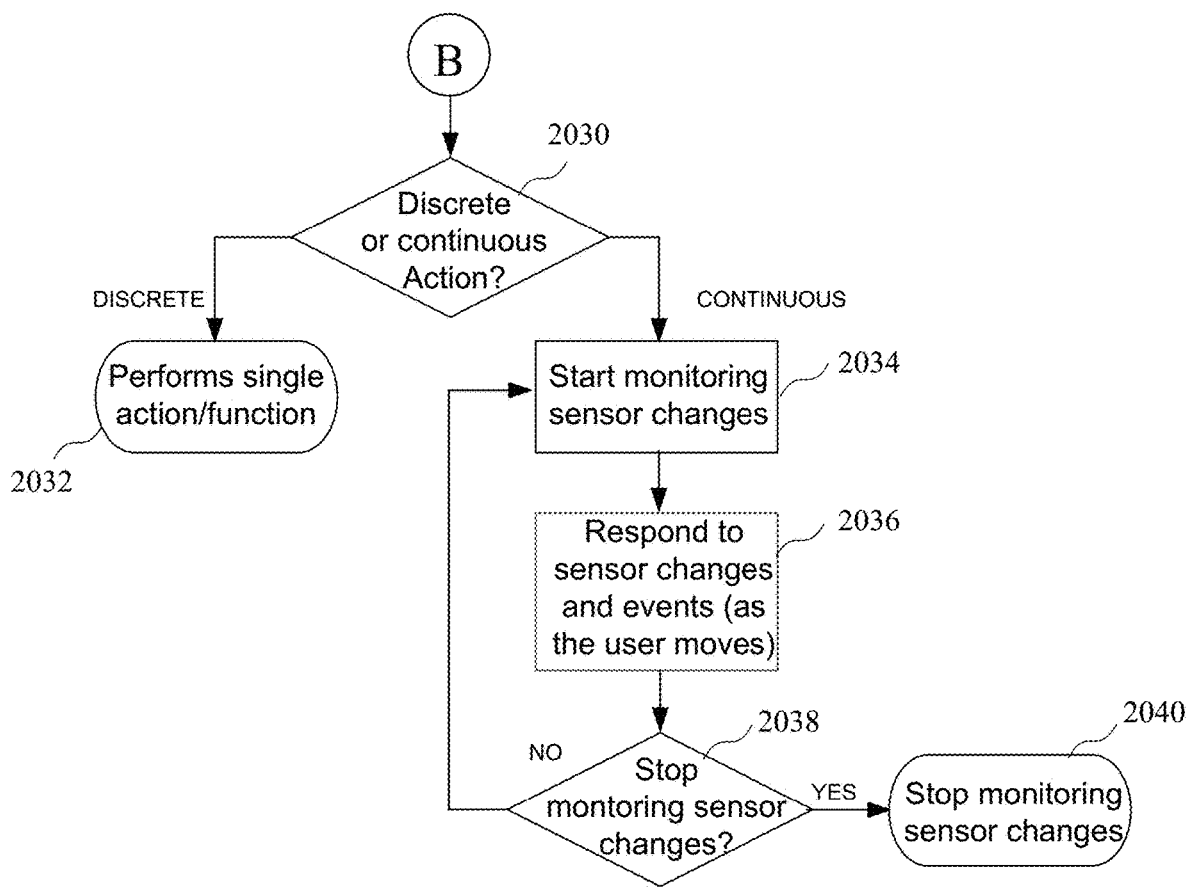
FIG. 20-B

SYSTEM AND METHOD FOR HEAD MOUNTED DEVICE INPUT

RELATED APPLICATION

The present application claims priority to U.S. Appl. No. 62/782,146, filed on Dec. 19, 2018, the entire application of which is incorporated by reference.

TECHNICAL FIELD

The present invention relates generally to electronic device that detect motion, and in particular, to a head mounted device adapted to detect motion.

BACKGROUND

Head mounted display (HMD) devices can be used to provide a variety of information or content to a user, and can provide different combinations of both real world images and virtual images. Virtual reality (VR) generally provides a user with a fully artificial digital image, often presented in an environment. Augmented reality (AR) overlays virtual objects on the real-world environment, and may include spatial registration that enables geometric placement and orientation within the real world. Mixed reality (MR) not just overlays real and virtual objects, but anchors virtual objects to real-world objects and allows the user to interact with combined virtual/real objects.

Virtual reality, augmented reality, and mixed reality devices may be implemented in many applications (apps), and provide both entertainment as well as practical applications for user, such as controlling external devices. However, when using a head mounted display (HMD) device, user interfaces for interacting with an application running on the HMD device may vary depending upon the application. Further, it may be difficult for some individuals to interact with user interface requirements of the HMD device. In existing situations where mixed reality (e.g., virtual reality, augmented reality, etc.) is utilized, controls for manipulating the interfaces are limited.

Accordingly, solutions are needed for improved controls for HMD devices, including for example mixed reality interactions.

SUMMARY

An embodiment of the invention encompasses a system and method of providing mixed reality inputs. Such embodiments may provide more immersive ways to control content displayed on an HMD device via movement. The user's movements may be used to correlate to changes in a virtual or augmented reality.

According to one implementation, a head mounted display device comprises a motion detector, a display, and a processor coupled to the inertial motion unit and the display. A memory is also coupled to the processor, wherein the memory stores executable instructions that cause the processor to define an available range for a motion and output a graphic user interface for the available range on the display. An input based upon a motion of the HMD device detected by the motion detector, within the available range is received. The HMD device or an external device may then be controlled in response to the input.

A method of operating a head mounted display device is also disclosed. The method comprises defining an available range for a motion and outputting a graphic user interface for the available range on a display. An input within the available range, based upon a motion of the HMD device detected by a motion detector, may also be received. The HMD device or an external device may also be controlled in response to the input.

A non-transitory computer-readable storage medium having data stored therein representing instructions executable by a processor to perform a method of operating a head mounted display device. The method comprises defining an available range for a motion and outputting a graphic user interface for the available range on a display. An input based upon a motion of the HMD device detected by a motion detector, within the available range may also be received. The HMD device or an external device may be controlled in response to the input.

BRIEF DESCRIPTION OF THE DRAWINGS

FIG. 20-A is a flow chart showing a method of operating platform event handlers and application event handlers in response to the detection of an event;

FIG. 20-B is a flow chart showing a method performing discrete or continuous actions in response to the detection of an event.

DETAILED DESCRIPTION

Figure 1:
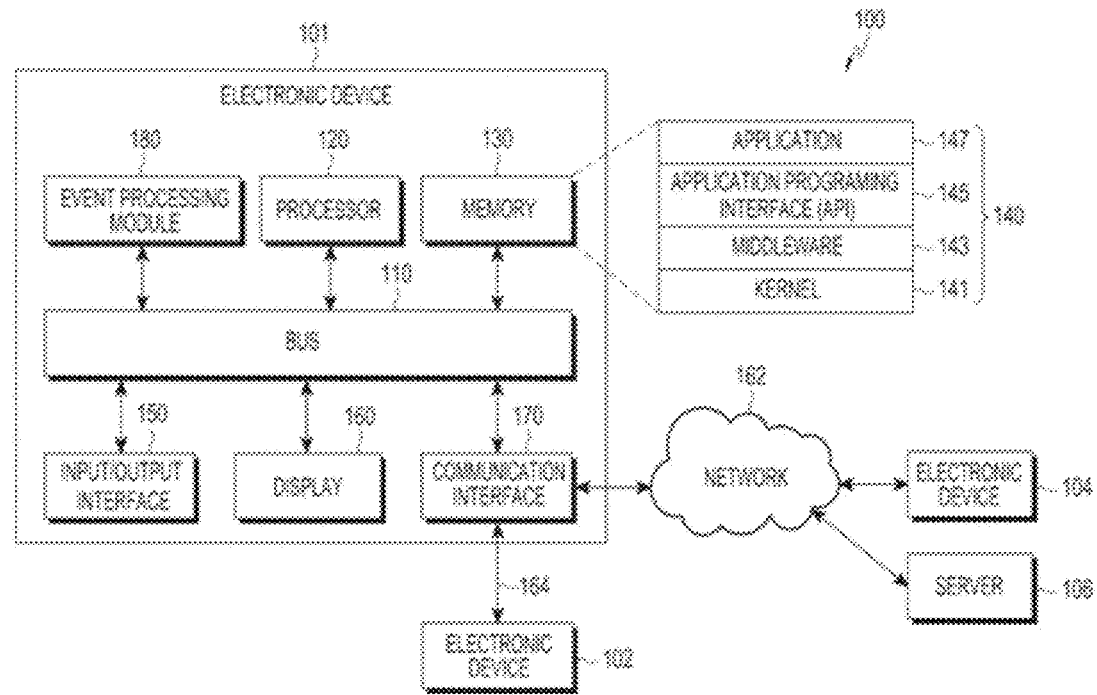
FIG. 1 illustrates an exemplary network configuration according to an embodiment of the present invention.

A description of example embodiments is provided on the following pages. The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present invention may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, an HMD, electronic clothes, an electronic bracelet, an electronic necklace, an electronic accessory, an electronic tattoo, a smart mirror, or a smart watch).

According to an embodiment of the present invention, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present invention, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves).

According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 illustrates an exemplary network configuration according to an embodiment of the present invention. According to an embodiment of the present disclosure, an electronic device 101 is included in a network environment 100. The electronic device 101 may include at least one of a bus 110, a processor 120, a memory 130, an input/output interface 150, a display 160, a communication interface 170, or an event processing module 180. In some embodiments, the electronic device 101 may exclude at least one of the components or may add another component.

The bus 110 may include a circuit for connecting the components 120 to 180 with one another and transferring communications (e.g., control messages and/or data) between the components.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 or 164 through wireless or wired communication to communicate with the external electronic device.

The first external electronic device 102 or the second external electronic device 104 may be a wearable device or an electronic device 101-mountable wearable device (e.g., an HMD). When the electronic device 101 is mounted in an HMD device (e.g., the electronic device 102), the electronic device 101 may detect the mounting in the HMD device and operate in a virtual reality mode. When the electronic device 101 is mounted in the electronic device 102 (e.g., the HMD device), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS).

The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or 106 via the network 162, the electronic device 101 may be independently operated without a separate communication function, according to an embodiment of the present invention.

The server 106 may support to drive the electronic device 101 by performing at least one of operations (or functions) implemented on the electronic device 101. For example, the server 106 may include an event processing server module (not shown) that may support the event processing module 180 implemented in the electronic device 101.

For example, the event processing server module may include at least one of the components of the event processing module 180 and perform (or instead perform) at least one of the operations (or functions) conducted by the event processing module 180.

The event processing module 180 may process at least part of information obtained from other elements (e.g., the processor 120, the memory 130, the input/output interface 150, or the communication interface 170) and may provide the same to the user in various manners.

Although in FIG. 1 the event processing module 180 is shown to be a module separate from the processor 120, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of the present invention in interoperation with at least one program 140 stored in the memory 130.

Exemplary embodiments described herein are not meant to be limiting and merely illustrative of various aspects of the invention. While exemplary embodiments may be indicated as applicable to a particular device category (e.g., head-mounted displays, etc.) the processes and examples provided are not intended to be solely limited to the device category and can be broadly applicable to various device categories (e.g., mobile devices, appliances, computers, automobiles, etc.)

Figure 2:
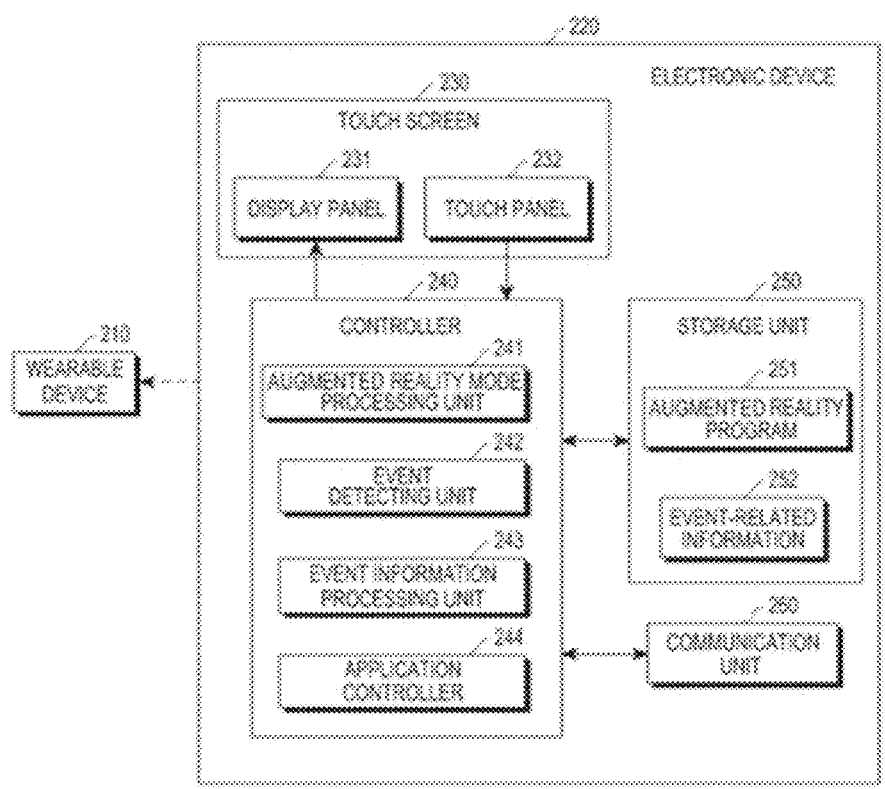
FIG. 2 is a block diagram illustrating an exemplary configuration of an electronic device according to an embodiment of the present invention.

FIG. 2 is a block diagram illustrating an exemplary configuration of an electronic device according to an embodiment of the present invention. Referring to FIG. 2, the electronic device 220 according to an embodiment of the present invention may be an electronic device 220 having at least one display means. In the following description, the electronic device 220 may be a device primarily performing a display function or may denote a normal electronic device including at least one display means. For example, the electronic device 220 may be an electronic device (e.g., a smartphone) having a touchscreen 230.

According to an embodiment of the present invention, the electronic device 220 may include at least one of a touchscreen 230, a controller 240, a storage unit 250, or a communication unit 260. The touchscreen 230 may include a display panel 231 and/or a touch panel 232. The controller 240 may include at least one of an augmented reality mode processing unit 241, an event determining unit 242, an event information processing unit 243, or an application controller 244.

For example, when the electronic device 220 is mounted in a wearable device 210, the electronic device 220 may operate, e.g., as an HMD device, and run an augmented reality mode. Further, according to an embodiment of the present invention, even when the electronic device 220 is not mounted in the wearable device 210, the electronic device 220 may run the augmented reality mode according to the user's settings or running an augmented reality mode related application. In the following embodiment, although the electronic device 220 is set to be mounted in the wearable device 210 to run the augmented reality mode, embodiments of the present invention are not limited thereto.

According to an embodiment of the present invention, when the electronic device 220 operates in the augmented reality mode (e.g., the electronic device 220 is mounted in the wearable device 210 to operate in a head mounted theater (HMT) mode), two screens corresponding to the user's eyes (left and right eye) may be displayed through the display panel 231.

According to an embodiment of the present invention, when the electronic device 220 is operated in the augmented reality mode, the controller 240 may perform control to process information related to an event generated while operating in the augmented reality mode to fit the augmented reality mode and display the processed information. According to an embodiment of the present invention, when the event generated while operating in the augmented reality mode is an event related to running an application, the controller 240 may block the running of the application or process the application to operate as a background process or application.

More specifically, according to an embodiment of the present invention, the controller 240 may include at least one of an augmented reality mode processing unit 241, an event determining unit 242, an event information processing unit 243, or an application controller 244 to perform functions according to various embodiments of the present invention. An embodiment of the present invention may be implemented to perform various operations or functions as described below using at least one component of the electronic device 220 (e.g., the touchscreen 230, controller 240, or storage unit 250).

According to an embodiment of the present invention, when the electronic device 220 is mounted in the wearable device 210 or the augmented reality mode is run according to the user's setting or as an augmented reality mode-related application runs, the augmented reality mode processing unit 241 may process various functions related to the operation of the augmented reality mode. The augmented reality mode processing unit 241 may load at least one augmented reality program 251 stored in the storage unit 250 to perform various functions.

The event determining unit 242 may determine an event generated while operated in the augmented reality mode by the augmented reality mode processing unit 241. Further, the event determining unit 242 may determine whether there is information to be displayed on the screen in relation with an event generated while operating in the augmented reality mode. Further, the event determining unit 242 may determine an application to be run in relation with an event generated while operating in the augmented reality mode. Various embodiments of an application related to the type of event are described below.

The event information processing unit 243 may process the event-related information to be displayed on the screen to fit the augmented reality mode when there is information to be displayed in relation with an event occurring while operating in the augmented reality mode depending on the result of determination by the event determining unit 242. Various methods for processing the event-related information may apply. For example, when a three-dimensional (3D) image is implemented in the augmented reality mode, the electronic device 220 may convert the event-related information to fit the 3D image. For example, event-related information being displayed in two dimension (2D) may be converted into information corresponding to the left and right eye corresponding to the 3D image, and the converted information may be synthesized and displayed on the screen of the augmented reality mode being currently run.

When it is determined by the event determining unit 242 that there is an application to be run in relation with the event occurring while operating in the augmented reality mode, the application controller 244 may perform control to block the running of the application related to the event. According to an embodiment of the present invention, when it is determined by the event determining unit 242 that there is an application to be run in relation with the event occurring while operating in the augmented reality mode, the application controller 244 may perform control so that the application is run in the background not to influence the running or screen display of the application corresponding to the augmented reality mode when the event-related application runs.

The storage unit 250 may store an augmented reality program 251. The augmented reality program 251 may be an application related to the augmented reality mode operation of the electronic device 220. The storage unit 250 may store the event-related information 252. The event determining unit 242 may reference the event-related information 252 stored in the storage unit 250 to determine whether the occurring event is displayed on the screen or identify information on the application to be run in relation with the occurring event.

The wearable device 210 may be an electronic device including at least one function of the electronic device 101 shown in FIG. 1, and the wearable device 210 may be a wearable stand to which the electronic device 220 may be mounted. In case the wearable device 210 is an electronic device, when the electronic device 220 is mounted on the wearable device 210, various functions may be provided through the communication unit 260 of the electronic device 220. For example, when the electronic device 220 is mounted on the wearable device 210, the electronic device 220 may detect whether to be mounted on the wearable device 210 for communication with the wearable device 210 and may determine whether to operate in the augmented reality mode (or an HMT mode).

According to an embodiment of the present invention, upon failure to automatically determine whether the electronic device 220 is mounted when the communication unit 220 is mounted on the wearable device 210, the user may apply various embodiments of the present invention by running the augmented reality program 251 or selecting the augmented reality mode (or, the HMT mode). According to an embodiment of the present invention, when the wearable device 210 includes functions as the electronic device 101, it may be implemented to automatically determine whether the electronic device 220 is mounted on the wearable device 210 and to enable the running mode of the electronic device 220 to automatically switch to the augmented reality mode (or the HMT mode).

At least some functions of the controller 240 shown in FIG. 2 may be included in the event processing module 180 or processor 120 of the electronic device 101 shown in FIG. 1. The touchscreen 230 or display panel 231 shown in FIG. 2 may correspond to the display 160 of FIG. 1. The storage unit 250 shown in FIG. 2 may correspond to the memory 130 of FIG. 1.

Although in FIG. 2 the touchscreen 230 includes the display panel 231 and the touch panel 232, according to an embodiment of the present invention, the display panel 231 or the touch panel 232 may also be provided as a separate panel rather than being in a single touchscreen 230. Further, according to an embodiment of the present invention, the electronic device 220 may include the display panel 231 but exclude the touch panel 232.

According to an embodiment of the present invention, the electronic device 220 may be denoted as a first device (or a first electronic device), and the wearable device 210 may be denoted as a second device (or a second electronic device) for ease of description.

According to an embodiment of the present invention, an electronic device may comprise a display unit displaying a screen corresponding to a augmented reality mode and a controller performing control to detect an interrupt according to occurrence of at least one event, vary event-related information related to the event in a form corresponding to the augmented reality mode, and display the varied event-related information on a screen run corresponding to the augmented reality mode.

According to an embodiment of the present invention, the event may include any one or more selected from among a call reception event, a message reception event, an alarm notification, a scheduler notification, a wireless fidelity (Wi-Fi) connection, a WiFi disconnection, a low battery notification, a data permission or use restriction notification, a no application response notification, or an abnormal application termination notification.

According to an embodiment of the present invention, the electronic device further comprises a storage unit storing the event-related information when the event is not an event to be displayed in the augmented reality mode, wherein the controller may perform control to display the event-related information stored in the storage unit when the electronic device switches from the augmented reality mode into a see-through mode.

According to an embodiment of the present invention, the electronic device may further comprise a storage unit storing information regarding at least one event to be displayed in the augmented reality mode.

According to an embodiment of the present invention, the event may include an instant message reception notification event.

According to an embodiment of the present invention, when the event is an event related to running at least one application, the controller may perform control to block running of the application according to occurrence of the event.

According to an embodiment of the present invention, the controller may perform control to run the blocked application when a screen mode of the electronic device switches from the augmented reality mode into a see-through mode.

According to an embodiment of the present invention, when the event is an event related to running at least one application, the controller may perform control to enable the application according to the occurrence of the event to be run on a background of a screen of the augmented reality mode.

According to an embodiment of the present invention, when the electronic device is connected with a wearable device, the controller may perform control to run the augmented reality mode.

According to an embodiment of the present invention, the controller may enable the event-related information to be arranged and processed to be displayed in a three dimensional (3D) space of the augmented reality mode screen being displayed on a current screen.

According to an embodiment of the present invention, the electronic device may include additional sensors such as one or more RGB cameras, DVS cameras, 360 degree cameras, or a combination thereof.

Figure 3:
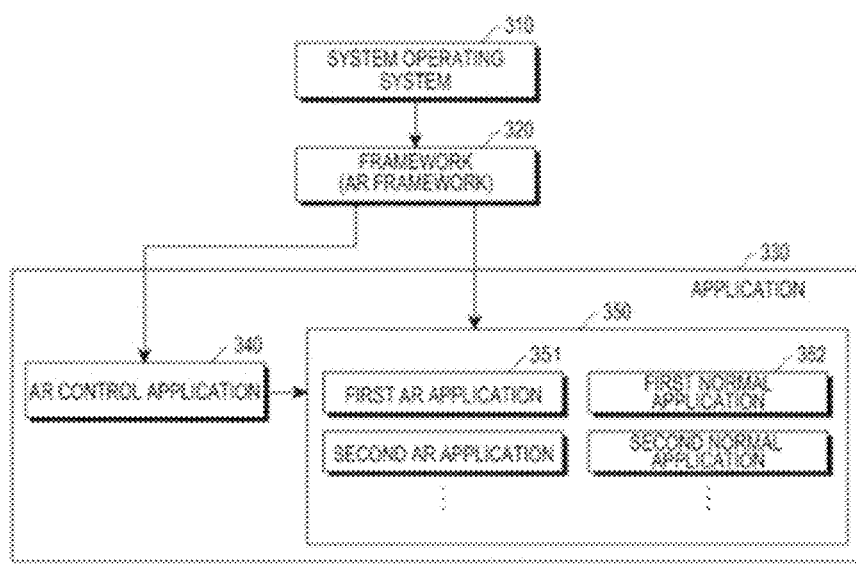
FIG. 3 is a block diagram illustrating a program module according to an embodiment of the present invention.

FIG. 3 is a block diagram illustrating a program module according to an embodiment of the present invention. Referring to FIG. 3, according to an embodiment of the present invention, the program module may include a system operating system (e.g., an OS) 310, a framework 320, an application 330.

The system operating system 310 may include at least one system resource manager or at least one device driver. The system resource manager may perform, e.g., control, allocation, or recovery of system resources, and the system resource manager may include at least one manager, such as a process manager, a memory manager, or a file system manager. The device driver may include at least one driver, such as, e.g., a display driver, a camera driver, a Bluetooth driver, a shared memory driver, a USB driver, a keypad driver, a Wi-Fi driver, an audio driver, or an inter-process communication (IPC) driver.

According to an embodiment of the present invention, the framework 320 (e.g., middleware) may provide, e.g., functions commonly required for the application or provide the application with various functions through the API to allow the application to efficiently use limited system resources inside the electronic device.

According to an embodiment of the present invention, the AR framework included in the framework 320 may control functions related to augmented reality mode operations on the electronic device. For example, according to running of an augmented reality mode operation, the AR framework 320 may control at least one AR application 351 related to augmented reality among applications 330 to provide the augmented reality mode on the electronic device.

The application 330 may include a plurality of applications and may include at least one AR application 351 running in the augmented reality mode and at least one normal application 352 running in a normal mode, but not the augmented reality mode.

According to an embodiment of the present invention, the application 330 may further include an AR control application 340. An operation of the at least one AR application 351 and/or at least one normal application 352 may be controlled under the control of the AR control application 340.

According to an embodiment of the present invention, when at least one event occurs while the electronic device operates in the augmented reality mode, the system operating system 310 may notify the framework 320 (e.g., the AR framework) of occurrence of the event.

The framework 320 may control the running of the normal application 352 so that event-related information may be displayed on the screen for the event occurring in the normal mode, but not in the augmented reality mode. When there is an application to be run in relation with the event occurring in the normal mode, the framework 320 may perform control to run at least one normal application 352.

According to an embodiment of the present invention, when an event occurs while operating in the augmented reality mode, the framework 320 (e.g., the AR framework) may block the operation of at least one normal application 352 to display the information related to the occurring event. The framework 320 may provide the event occurring while operating in the augmented reality mode to the AR control application 340.

The AR control application 340 may process the information related to the event occurring while operating in the augmented reality mode to fit the augmented reality mode. For example, 2D, planar event-related information may be processed into 3D information.

The AR control application 340 may control at least one AR application 351 currently running and may perform control to synthesize the processed event-related information with the running screen by the AR application 351 and display the result.

According to an embodiment of the present invention, when an event occurs while operating in the augmented reality mode, the framework 320 may perform control to block the running of at least one normal application 352 related to the occurring event.

According to an embodiment of the present invention, when an event occurs while operating in the augmented reality mode, the framework 320 may perform control to temporarily block the running of at least one normal application 352 related to the occurring event, and when the augmented reality mode terminates, to run the blocked normal application 352.

According to an embodiment of the present invention, when an event occurs while operating in the augmented reality mode, the framework 320 may control the running of at least one normal application 352 related to the occurring event so that the at least one normal application 352 related to the event operates on the background so as not to influence the screen by the AR application 351 currently running.

The embodiment described in connection with FIG. 3 is an example for implementing an embodiment of the present invention in the form of a program, and embodiments of the present invention are not limited thereto and rather may be implemented in other various forms. Further, while the embodiment described in connection with FIG. 3 references AR, it may be applied to other scenarios such as virtual reality, mixed reality, etc. In such embodiments, the AR portions or components may be utilized to enable the virtual reality or mixed reality aspects. Collectively the various reality scenarios may be referenced herein as XR.

Figure 4:
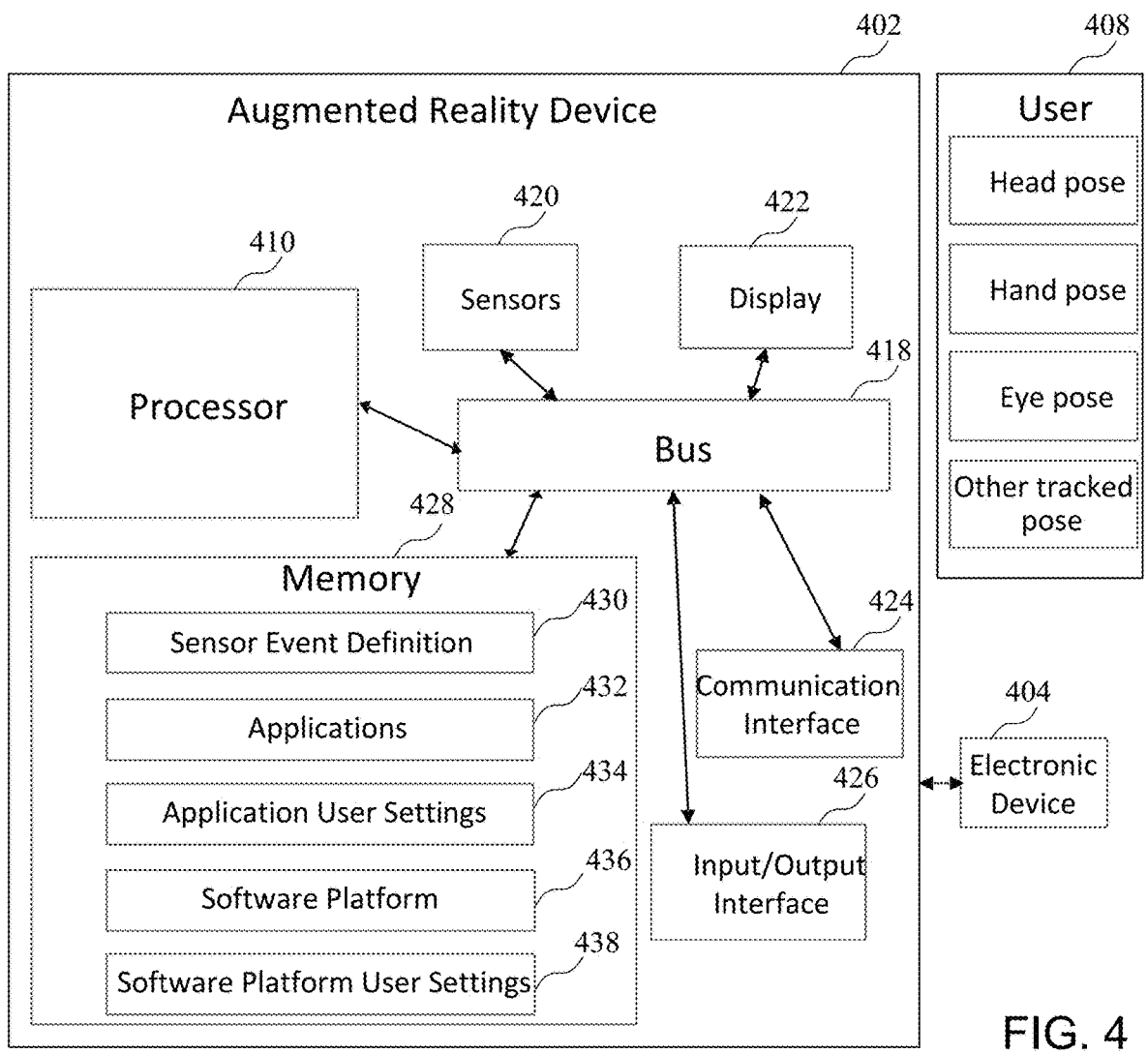
FIG. 4 is a block diagram illustrating an augmented reality device.

FIG. 4 is a block diagram illustrating an AR device. The AR device 402 may be a stand-alone device (i.e. having circuits for performing operations of the AR device), a drop-in device (i.e. where a mobile device such as a smart phone is inserted into the AR device), or a tethered device, where a device having circuits for performing operations of the AR device is tethered to the AR device. The AR device 402 of FIG. 4 may be coupled to an electronic device 404 and is configured to detect inputs 408 from a user, such as head pose, hand pose, eye pose, or other tracked poses for example. For some AR devices, the electronic device 404 may be a controller external to the HMD device. The electronic device 404 implemented as a controller can be as simple as a single button or more complex than a video game controller. For example, there could be an interaction where the user holds a button on the controller to activate head tracked interactions. According to other embodiments, the electronic device could be a mobile device, such as a smart phone for example, and could be implemented as a software controller. The AR device 402 also comprises a processor 410 for running applications (apps), which may be specific AR applications generated by developers to provide a specific AR feature, and for operating a platform, which may be the operating system for the HMD device. The processor may also perform sensor event detection, and is coupled to a bus 418. The processor may perform the function of an application event handler that may use sensor event data to recognize an event based upon sensor event definitions stored in the memory, and determine an action to be taken based upon the recognized event. Similarly, the platform operated by the processor 410 may perform the function of a platform event handler that may also use data from the sensor event data to recognize an event based upon sensor event definitions stored in the memory, and determine an action to be taken based upon the recognized event. Examples of operations of the processor for performing application event handling and the platform event handing are described below in reference to FIGS. 20 and 21.

The processor 410 may be configured to operate programs as an AR program according to the program module of FIG. 3, where a platform for the AR device 402 may be implemented according to the AR control application 340 as described above. According to some embodiments, the processor 410 may also perform monitoring of sensor data and may return values based upon detected sensor data. Detected sensor values may be compared with sensor event definitions stored in a memory to recognize certain events that may be used by the HMD device to control the HMD device or an external device. For example, data related to lateral movement, longitudinal movement, vertical movement, or rotational movement of the HMD device can be filtered to determine whether an event that may be used for controlling the HMD device has been detected. These events may vary in specificity and can be overlapping between applications. Developers of applications may abstract their own events from the raw data, or rely on the platform to provide information related to detected events (i.e. detection motions of the HMD device). According to some embodiments, certain detected events may only be used by the platform.

When an event is detected, the platform determines how the detected event is processed, and what action may be taken in response to the event. The platform may be configured to allow a user to change event responses (i.e. an action by the HMD taken in response to the detected events). The platform may provide access to the events to developers. This access may include raw sensor data, or an identification of an event. Developers of apps may also allow a user to control features of an app, such as allowing user to change event responses. If an event is protected by the platform, the platform may not make that event available to the developers of an app to use that detected event for a control signal generate when running the app. For example, if a head tilt to the right is defined by the platform to open the user's notifications, the platform may prevent a developer from changing that interaction or use that event in an app. That is, the platform may be dominant over applications, and control the sensor data available to the app.

The bus 418 may also configured to interface with sensors 420, a display 422, a communication interface 424, an input/output interface 426, and a memory 428. The sensors 420 may comprise any type of sensor used by the HMD device, and could include for example, a motion sensor, such as an inertial measurement unit (IMU), an accelerometer, a gyroscope, a proximity sensor, a depth detector, a camera, or any other sensor that may be used to detect the motion or orientation of the HMD device or inputs detected by the HMD device. The communication interface 424 may be implemented as described above in reference to communication interface 170, while the input/output interface 426 may be implemented as described above in reference to input/output interface 150.

The memory 428 may store various applications and data used by the processor, including for example sensor event definitions 430, applications 432, application user settings 434, a software platform 436, and software platform user settings 438. The sensor event definitions 430 may comprise definitions of detected events, such as a lateral movement, a longitudinal movement, a vertical movement and a rotational movement, or a combination of movements which may be detected by a sensor of the HMD device, such as a motion sensor for example. It should be understood that sensor event definitions may include events having data related to multiple sensors. For example, a sensor event definition may include information not only related to a motion, but also where the user of the HMD device is facing during the motion. For example, as described in the examples of FIGS. 15 and 16 below, an action may be taken (e.g. turning on a light) with respect to a detected event based not only on a head motion detected by an IMU, but also based upon the direction the user of the HMD device is facing or the proximity of the HMD device to the external device.

A user may also be able to control settings related to applications, and in some cases related to the platform. According to some implementations, a user of the HMD may be allowed to set thresholds, which may provide improved comfort during operation. For example, if a user has had a neck injury and the default tilt angle is too extreme, the user could set minimum and maximum thresholds in the app user settings 434. According to other embodiments, a user may be allowed to set a platform level interaction in the platform user settings 438. For example, in platform settings, there could be an option to set a head tilt action to perform a specific task (e.g. open notifications, go home, check doorbell camera).

The control features set forth in more detail below for an HMD device provide a user of the HMD device with an additional way to control the HMD device which is useful for both abled and disabled individuals, such as using head motion to move through ranged content (e.g. lists of content or content that has a time dimension such as audio or video content). When a gesture-based control mode of the motion system is activated, the user's movements are mapped to a predefined range, and more particularly within a minimum and maximum value of the range. Detected user's movements inside that range can correlate to changes in the V/AR world. For example, the user can scrub through an individual piece of media (e.g. a song) or collections of media (e.g. photos and videos from a particular time). System status (i.e. where the user is within a range) can be displayed in space around the user, in the V/AR world, or not at all (e.g. a passive experience). Threshold values can be set, where exceeding a threshold within the range can be determined to be an event that may be used to control the HMD device. For example, head motion past a threshold may be used to trigger a quick action. The AR/VR headset view may be extended to include extended screen and launch applications, content with gestures or events. Connected devices can utilize user gestures when the user is close, such as smart speakers that are responsive to voice commands or appliances such as lamps.

Figure 5:
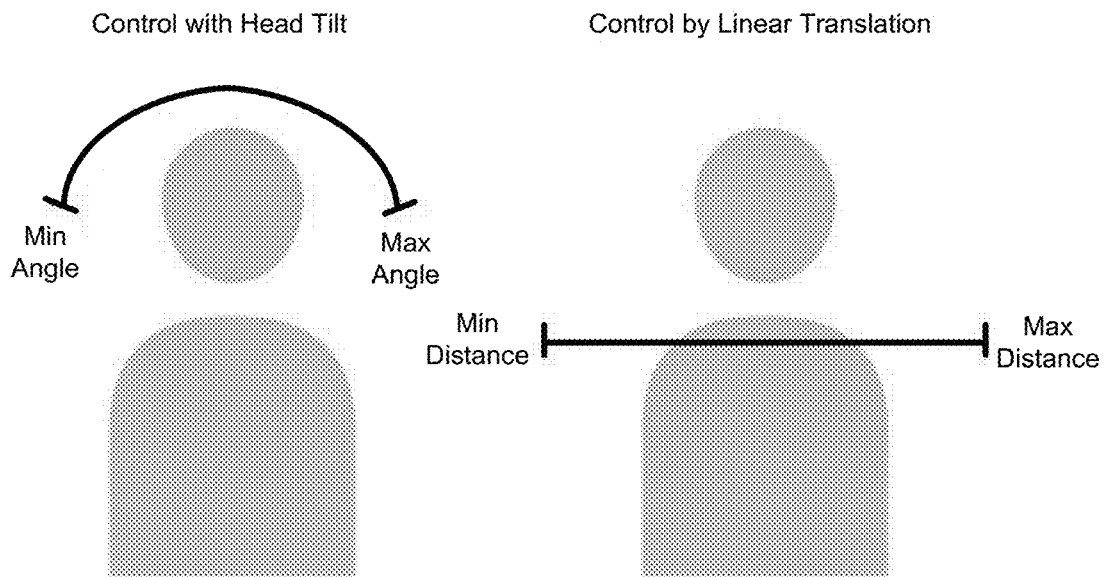
FIG. 5 illustrates an exemplary scenario of providing control over a range based on a detected head tilt movement of a user or linear translational movement of a user.

According to various embodiments, positional changes in a portion of the body, such as a motion of a body of a user wearing an HMD device or a motion of a head of a user (e.g. lateral head movement, a longitudinal head movement, a vertical head movement, or a rotational head movement as will be described in more detail below) wearing an HMD device, comprise events that are detected and used to control a device, such as an HMD device, or a device external to the HMD device, such as a computer, TV, laptop computer, or any other electronic device or appliance, including a lamp for example. The HMD device or external device may provide content, such as audio or visual content, to the user on the HMD device or by way of an external device such as a speaker, TV or other display device, where the content may be controlled based upon detected positional changes in the HMD device. FIG. 5 illustrates an exemplary scenario of providing control over a range based on a detected head tilt movement of a user or linear translational movement of a user. Such detection may be performed by an inertial motion unit (IMU) of a device for example, alone or in combination with another sensor of the HMD device.

An available range is defined for an event comprising a positional change used to control the HMD device or an external device. As shown in FIG. 5, an available range for a head tilt (i.e. a motion of the head toward one shoulder or the other shoulder in the plane of the body of the user of the HMD device) is defined, where the range may comprise a minimum (min) or a maximum (max) angle associated with the tilting of the head that could be detected by the HMD device. Alternatively, minimum and maximum range values may be minimum and maximum distances based upon a linear translation of a user of an HMD device. The available range may be displayed on a display as a visual guide path to enable a user of the HMD device to determine the user's location within the range, or determine whether a threshold is met for purposes of generating a control signal, such as for controlling an external device as will be described in more detail below. Specific examples of control using detection of a head tilt or linear translation are provided in more detail below.

The minimum and maximum angles may be measures from a reference angle (e.g. where the user wearing the HMD is facing forward, and the measured angle to one side may be a positive angle and the measured angle to the other side may be a negative angle). The minimum and maximum distances may be from a center point, such as where the user wearing the HMD is initially standing. Alternatively, the minimum distance may be an initial standing point, and motion to one side or the other may be used to change a location while scrubbing audio or video for example after the audio or video is advanced.

While double-headed arrows (e.g. the double-headed arrows showing the minimum or maximum angles or the minimum or maximum distances in FIG. 5) are shown in the figures to indicate the motion and provide examples of thresholds to cause an action, the double-headed arrows may be shown on a display of the AR device to make a user aware of the motions that may be made to provide input to the AR device, as will be described in more detail below. For example, for some applications where the motion of the head may be intuitive, it may not be necessary or beneficial to show the double-headed arrows as visual guides, while it may be beneficial to include the visual guides for other applications where motions for providing input may be less intuitive. While angles and distances are shown by way of example, it should be understood that any other type of measurement associated with a motion could be provided with a visual guide to help a user provide input based upon a motion of the head.

A minimum value and maximum value, such as a minimum tilt or max tilt as shown in FIG. 5, may be determined by a platform associated with the AR device, an application running on the AR device, or may be user selectable. It should also be understood that minimum and maximum values may relate to physical limitations of an average user or a specific user (such as the degree to which a user can perform a head tilt). Alternatively, minimum and maximum values may be based upon a restriction associated with an app running on the HMD device, or how a particular app presents content in an augmented reality or mixed reality environment.

Figure 6:
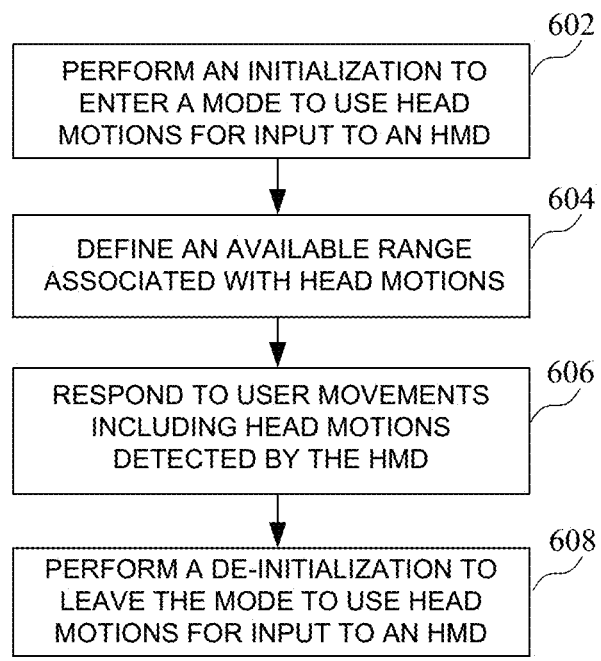
FIG. 6 illustrates an exemplary flow diagram for an HMD device to utilize positional movement to control content.

FIG. 6 illustrates an exemplary flow diagram for an HMD device to utilize positional movement to control content. An initialization is performed at a block 602, where an initialization may comprise an event recognized by the HMD to allow the HMD device to enter into a mode of the HMD that uses head motions to be received as inputs to the HMD that may be used during operation of the HMD. For example, during an initialization, the HMD device may enter a gesture-based control mode allowing the detection of a motion of the HMD device to be used to control the content accessed by the HMD device or to control an external device, as described in more detail in reference to FIGS. 7-19. An initialization may be based upon controller click events (e.g. an interaction of a user of the HMD device with a controller of the HMD device or a device in communication with the HMD device), voice, hand gestures, or image recognition for example. An available range is defined at a block 604. The available range may be defined as shown above in reference to FIG. 5 for example, where the available range may extend from a minimum value to a maximum value, such as a minimum angle to a maximum angle or a minimum distance to a maximum distance. The available range can be determined based upon different factors, including for example average ranges of motion associated with the head, ranges of motion associated with a particular user, dimensions or orientation of a particular environment that the HMD is operating in, such as dimensions of a room or the location of objects in a room. The available range could also depend upon an application or particular function within an application, such as providing control for an external device or navigating though content on a display.

The HMD device may then respond to user movements, such as head motions detected by the HMD, at a block 606. For example, a head rotation or translation or a body rotation or translation could be detected as an event for controlling the HMD device or an external device. A response to the detected user movements could include changing media that could include individual media or a collection of media, such as images, video, audio, meshes or objects. Particular examples of responding to user movements is described in more detail below. De-initialization may then be performed at a block 608. According to some embodiments, de-initialization may cause the HMD device to exit the gesture-base control mode. De-initialization may also comprise an event recognized by the HMD to allow the HMD device to exit the mode of the HMD that uses head motions to be received as inputs to the HMD. The de-initialization may also be caused by controller click events, voice, hand gestures, or image recognition for example.

FIGS. 7-19 provide examples of motions that may be detected and recognized as events that may be used by the platform or apps to take an action in response to the detected motion. Visual guide paths may be provided on the display and used by a user to understand a motion necessary to achieve a result, such as a changing of content controlled by the HMD device or controlling an external device. It should be understood that the examples of FIGS. 7-19 could be implemented in an augmented reality environment or in a mixed reality environment, where real and virtual objects are not only overlaid, but virtual objects are anchored to real-world objects and to allows the user to interact with combined virtual/real objects. According to some embodiments, content may be displayed at an identified static position in the real world. Therefore, when the user of the HMD moves or changes a head position, the displayed content will remain in the same place in the real world (and therefore appear in a different place on the display as a result of the movement of the user or the change of the head position). According to other embodiments, content may be displayed at a static position relative to the HMD device, so the content will always be displayed in the same location on the display despite movements of the user or changes in the head position.

Figure 7A:
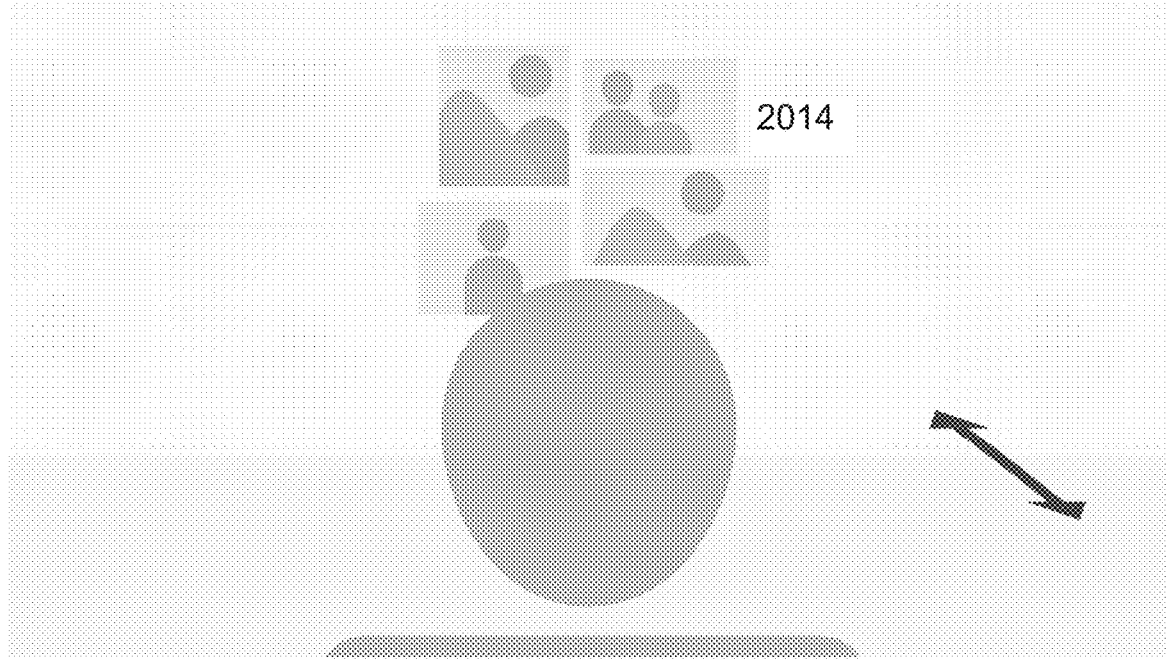
FIGS. 7A-7C illustrates an exemplary scenario where for a longitudinal movement may serve as input for adjusting the displayed content.
Figure 7B:
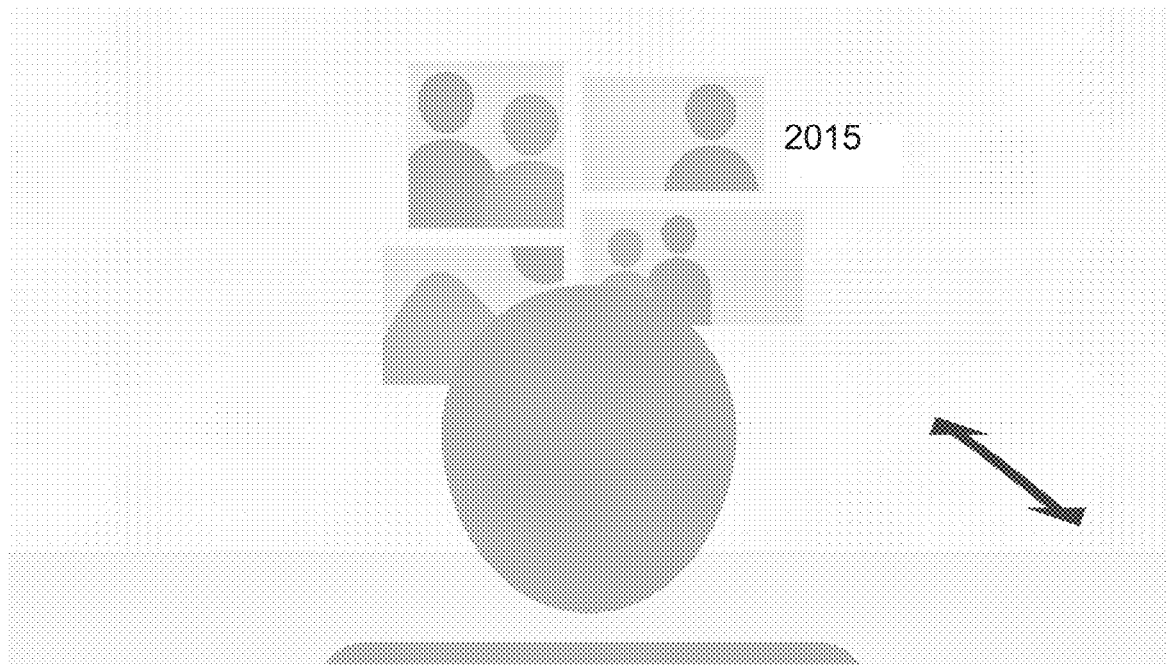
Figure 7C:
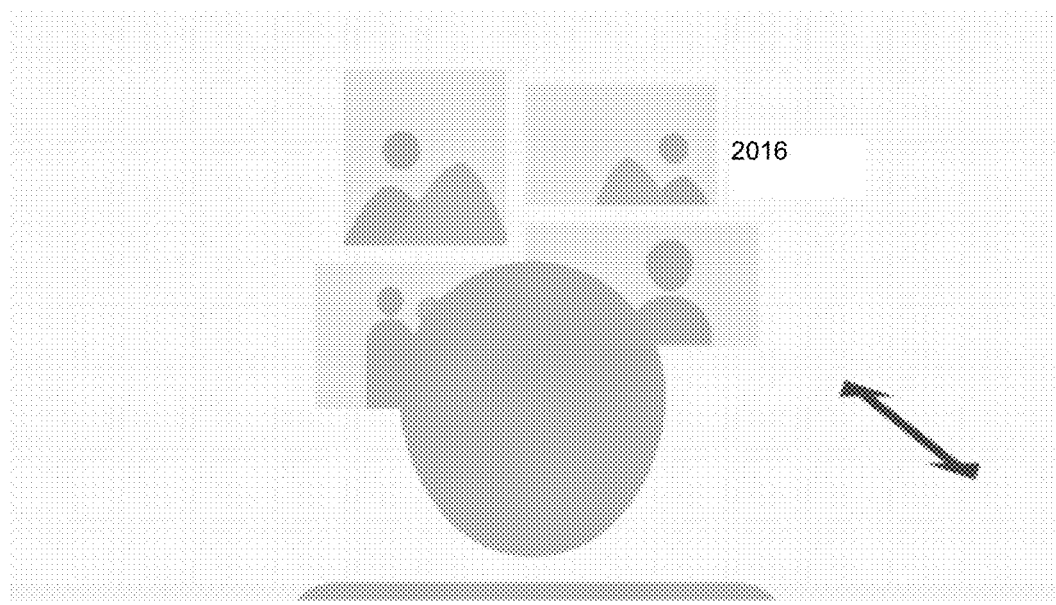

FIGS. 7A-7C illustrates an exemplary scenario where a longitudinal movement (i.e. movement of the user of the HMD device generally in a plane perpendicular to the plane of the body of the user of an HMD device) may serve as input for controlling an HMD device or an external device. As will be described in more detail below, the detection of the longitudinal movement may be used to adjust displayed content. According to the example of FIGS. 7A-7C, the system displays media that correlates to where the user is located within the range, where content from a time period (e.g., the year 2014) is shown when far away from the wall and more recent content (e.g., the year 2016) may be displayed as the user approaches the wall. A collection of content, such as images, may be from a particular year, e.g., 2014 as shown in FIG. 7A, where a visual guide path shown by the double-ended arrow indicates a motion that can be taken by the user of the HMD device to change content as shown in FIGS. 7 and 8 for example. As longitudinal movement is detected, content from a different year may be shown. Such a change may be chronological change (e.g. by day, week, month or year). As a user moves forward (i.e. closer to the user's wall displaying the content on the display of the HMD device), photos from 2015 are displayed, as shown in FIG. 7B. As the user continues to move forward, more recent content is shown, such as photos from 2016 as shown in FIG. 7C. The granularity of the change in content can be determined based upon the application displaying the content, and may vary based upon the amount of content. For example, when there is less content (e.g. few pictures), the time period may be shorter (e.g. months). However, the displayed content may change by a year or a range of years in response to the longitudinal movement of the user when the app is accessing more content.

Figure 8A:
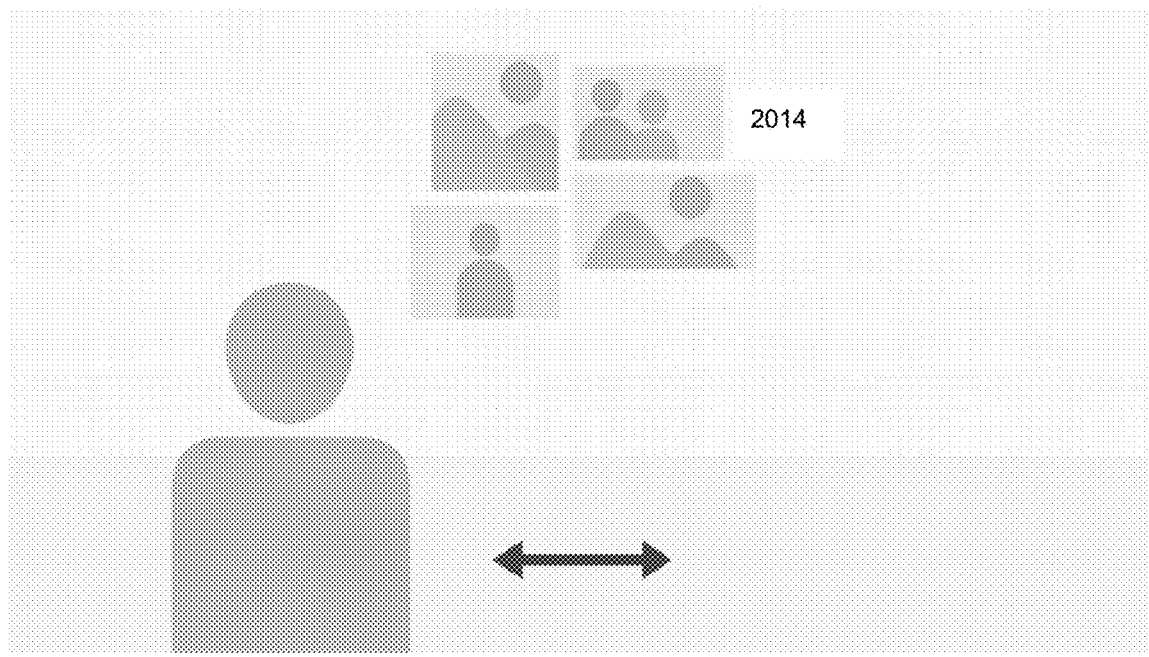
FIGS. 8A-8C illustrates an exemplary scenario where lateral movement adjust the displayed content.
Figure 8B:
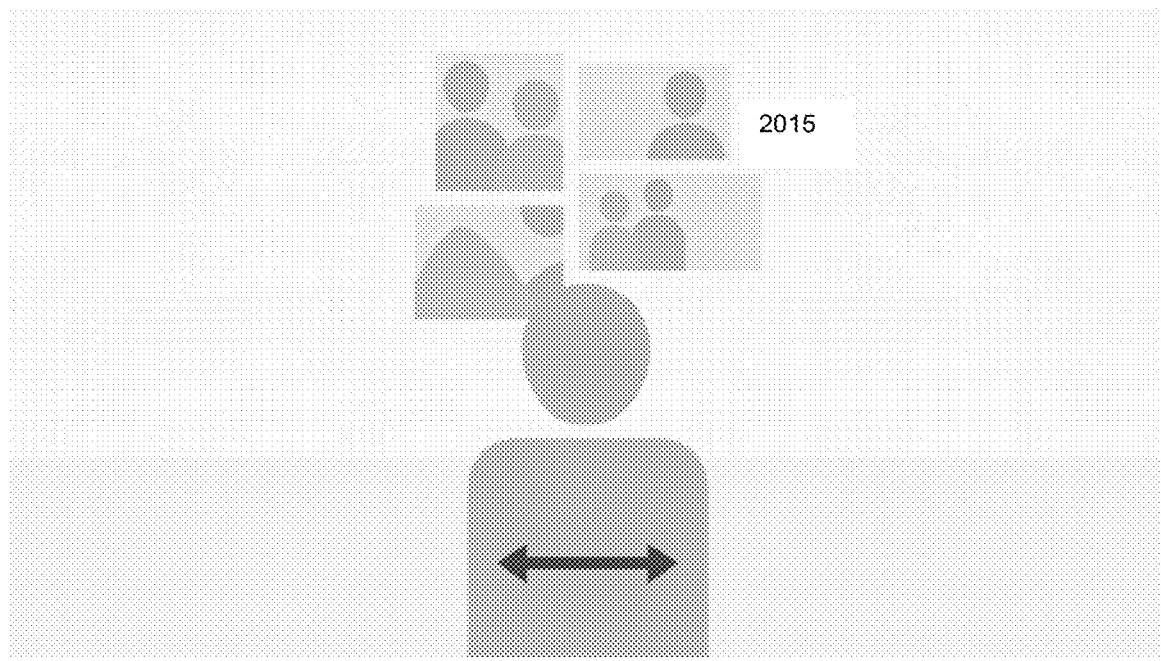
Figure 8C:
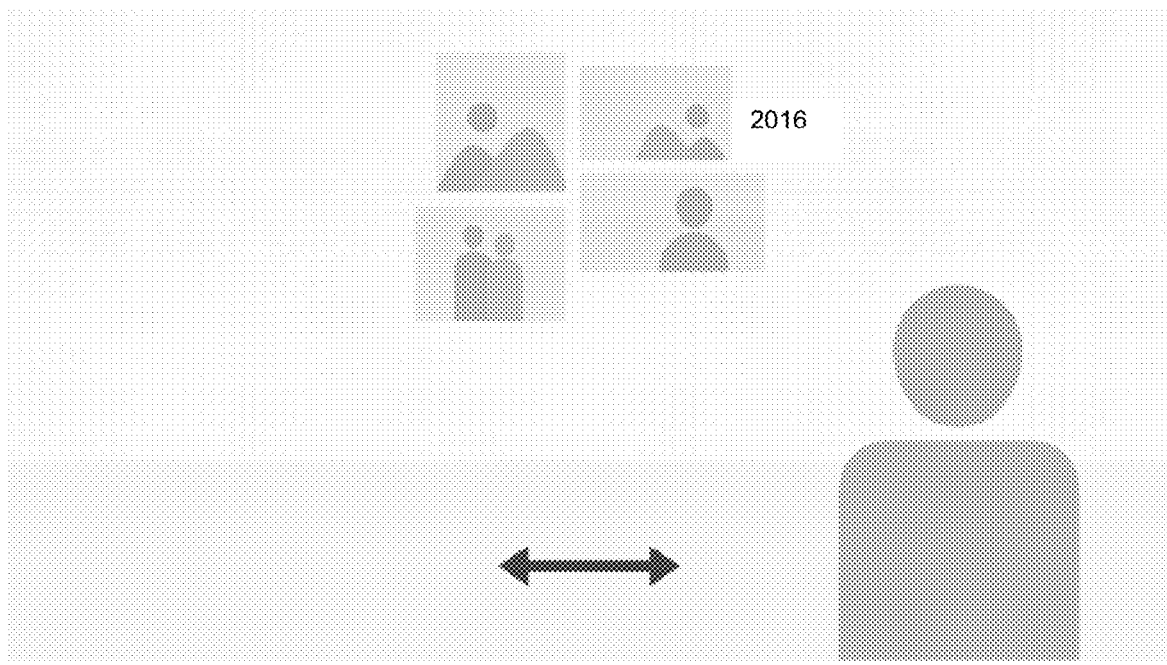

FIGS. 8A-8C illustrates an exemplary scenario where lateral movement is used to adjust the displayed content. In an example of chronological content being shown, the lateral movement (i.e. horizontal movement of the user of the HMD device generally in a plane parallel to the plane of the body of the user of an HMD device) may result in different time periods, such as days, weeks, months or years as described above in reference to FIGS. 7A-7C, being displayed based on detected positional changes. As a user moves left, photos from earlier years may be displayed, while photos from more recent years may be displayed as the user moves to the right. The granularity of the change in content according to the embodiment of FIG. 7 can also be determined based upon the application displaying the content, and may vary based upon the amount of content.

Figure 9:
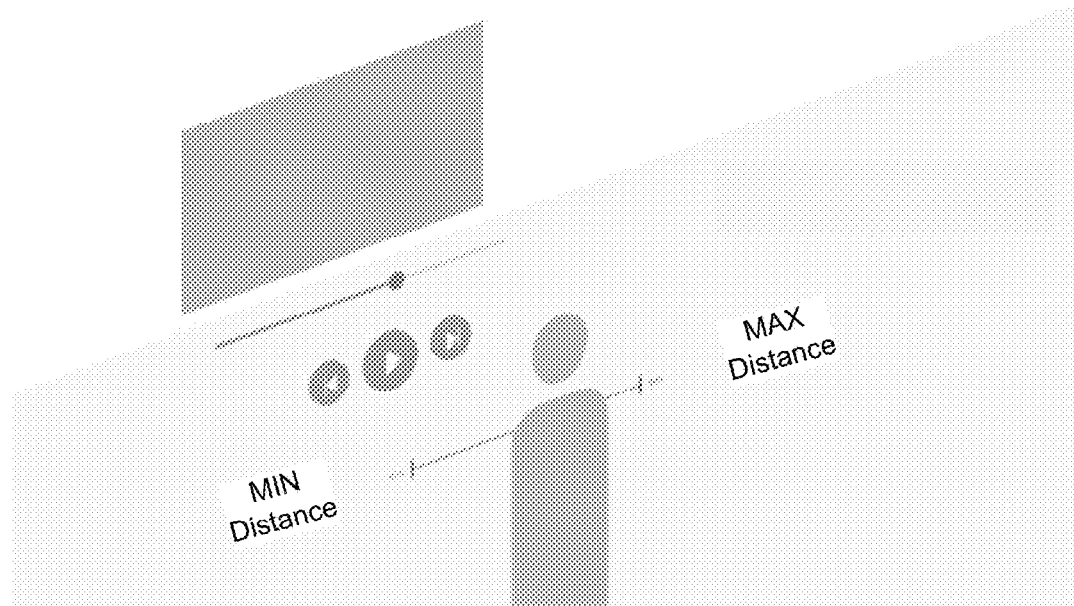
FIG. 9 illustrates an exemplary scenario where a location in a multimedia content may be controlled based on a user's detected positional movement.

FIG. 9 illustrates an exemplary scenario where a location in a multimedia content may be controlled based on a user's detected positional movement. Such movement can control the position of video or audio playback in a recording. According to the embodiment of FIG. 9, the playback of a video can be controlled by linear translation, shown here by way of example as a lateral movement of the user of the HMD device viewing the video. That is, the user can move left or right to change which part of the video is playing. While lateral movement is shown by way of example, it should be understood that video playback could be controlled based upon longitudinal movement as described in FIGS. 7A-7C. A visual guide path, shown by the max and min distance indicators provide guidance to the user to allow the user to make a lateral movement to control video playback.

Figure 10:
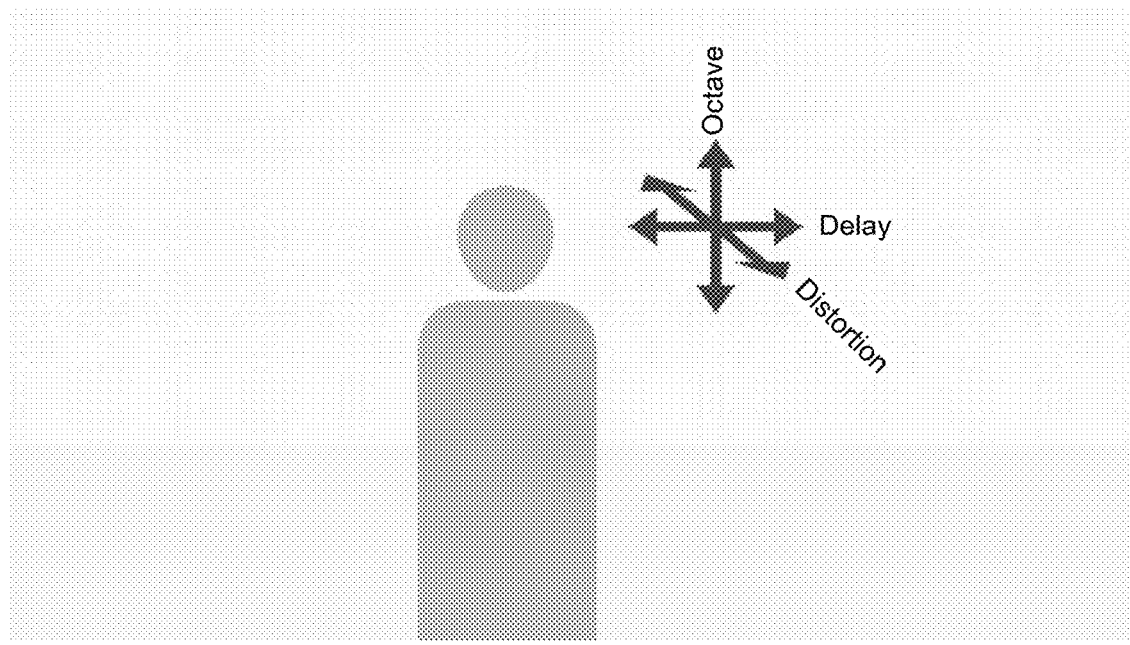
FIG. 10 illustrates an exemplary scenario where multiple directions of positional movement may each control an aspect of multimedia content.

FIG. 10 illustrates an exemplary scenario where multiple directions of positional movement may each control an aspect of multimedia content. For example, in an expressive music application, the user's head motion could affect three variables based upon latitudinal, longitudinal and vertical directional motion. As shown in FIG. 10, in the case of audio content or audio editing software, vertical movement (i.e. a movement of the head in a vertical direction) may control octave, lateral movement may control delay, and longitudinal movement may control distortion. Vertical motion could be achieved by the user jumping or crouching for example. While octave, delay and distortion are shown by way of example, it should be understood that other characteristics of the audio, such as treble, base, or volume for example could be adjusted based upon the multiple directions of positional movement. A visual guide path may be provided by the arrows indicating how to change octave, delay or distortion.

Figure 11:
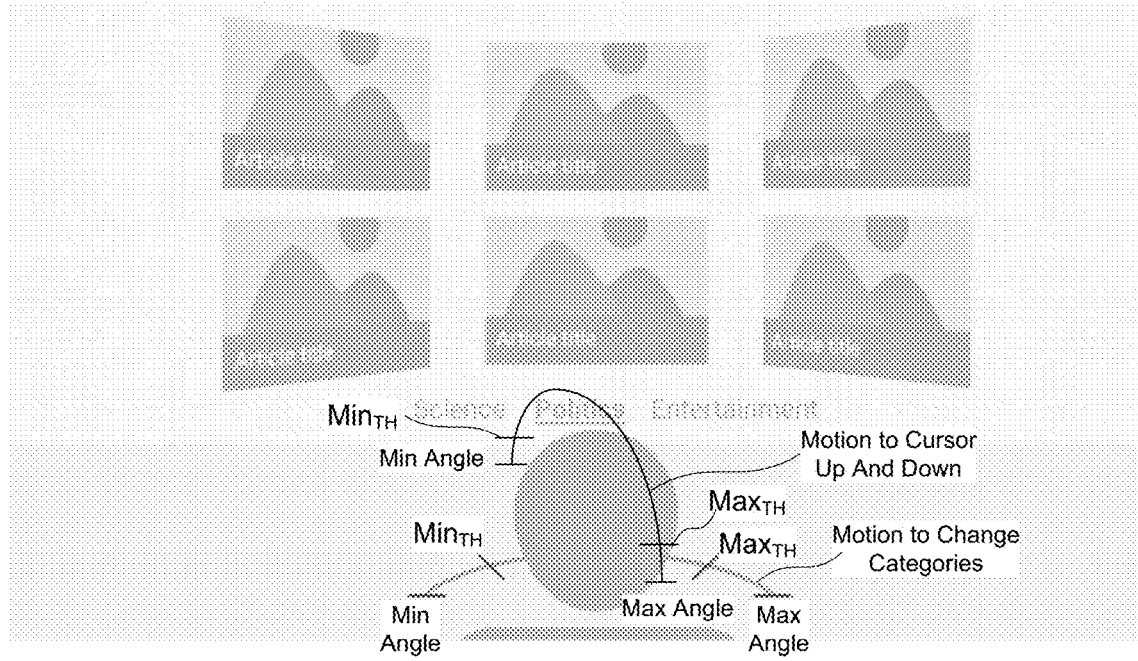
FIG. 11 illustrates an exemplary scenario where rotational movement may control category selection of displayed content.

FIG. 11 illustrates an exemplary scenario where rotational movement may control category selection of displayed content. According to the example of FIG. 11, an application could use head rotation to preview articles from different categories, shown by way of example here as "Science," "Politics," or "Entertainment." According to the example of FIG. 11, a backward and forward tilting of the head could be used to cursor up and down in the displayed articles. Min and max rotation values are also shown, where the user of the HMD device may change from one category to another when a minimum threshold ($MIN_{TH}$) or a maximum threshold ($MAX_{TH}$) is reached. For example, the displayed articles may switch from Politics to Science when the head rotation exceeds the $MIN_{TH}$ value, or the displayed articles may change from Politics to Entertainment when the head rotation exceeds the $MAX_{TH}$ value. Moving a cursor up and down through different pages may be achieved tilting the head forward or backward until a minimum threshold or maximum threshold is reached. A particular article can be selected for viewing in response to another action that may be detected by the HMD device, such as a fast movement of the head forward (i.e. a nodding of the head) for example.

Figure 12:
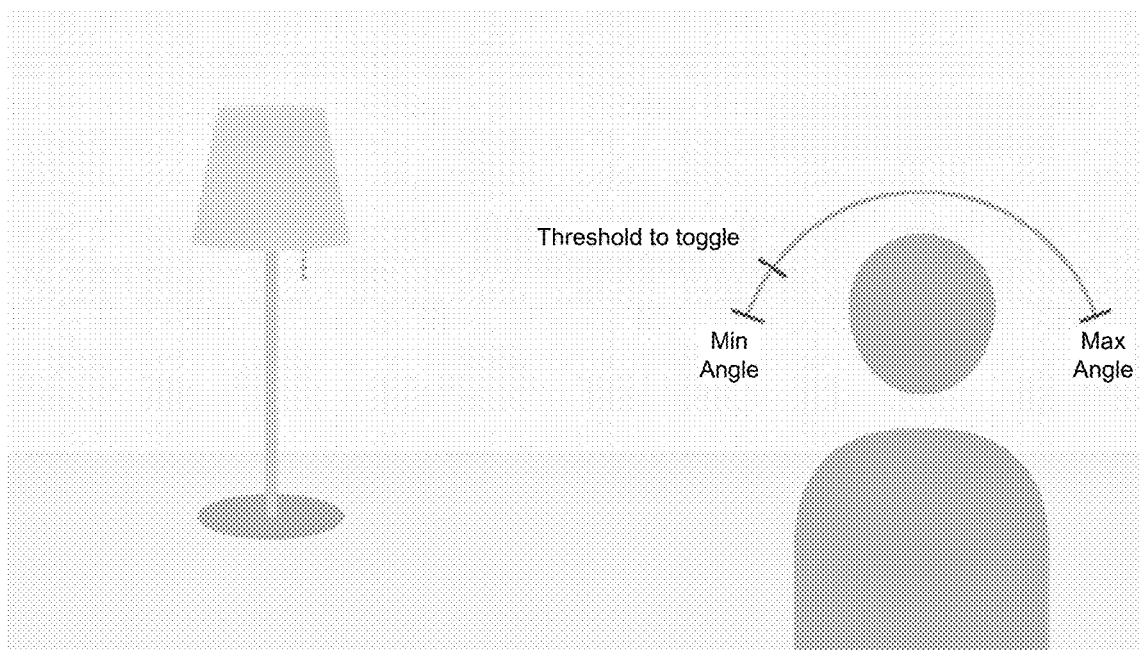
FIG. 12 illustrates an exemplary scenario where a detected head tilt movement may control connected devices.

FIG. 12 illustrates an exemplary scenario where a detected head tilt movement may control connected devices. According to the implementation of FIG. 12, an internet-of-things (IoT) application could use a head tilt as a trigger to toggle the light (e.g. for a head past a threshold, all lights will be toggled on/off) or controlled by distance and field of view to the lights (e.g. when near a light that a user is looking at and when the head is tilted past a threshold, the light is toggled on/off). As shown in FIG. 12, a min and max angle for detecting head tilting is defined. The minimum and maximum angle may be defined to enable establishing a threshold to toggle. That is, once the maximum and minimum angles of a range are established, a threshold to toggle can be set as a certain number of degrees within a threshold for example. When the user is viewing the light and a head tilt past the threshold to toggle is detected, the light could change states (i.e. turn on when it is off or turn off when it is on). Other motions such as a forward or backward motion of the head could be used to control other features of the light, such as dimming the light for example. While a lamp is shown by way of example, the use of a minimum and maximum range and a toggle threshold could be established for other devices or appliances.

Figure 13:
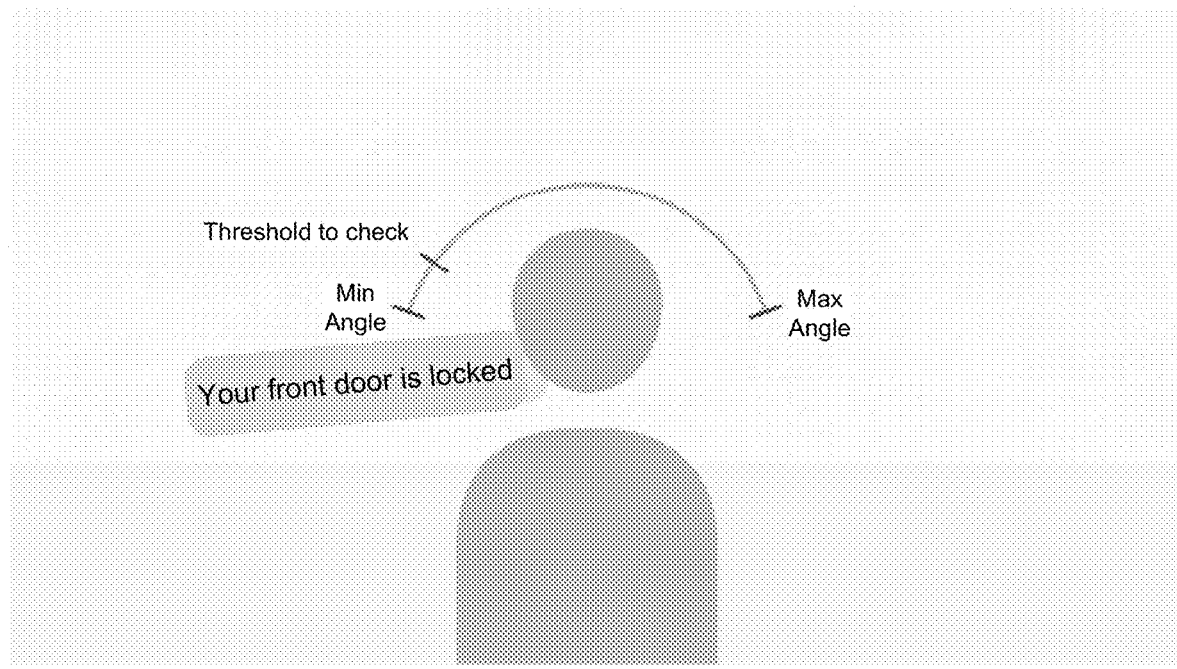
FIG. 13 illustrates an exemplary scenario where a notification response (e.g., a dismissal, a selection, etc.) may be performed using a detected head tilt based on passing a threshold.

The detection of a motion of the head could also be used to determine a state or condition of a device, such as a device or element of a smart home. For example, FIG. 13 illustrates an exemplary scenario where a notification response (e.g., a dismissal, a selection, etc.) may be performed using a detected head tilt based on passing a threshold. An AR or VR platform could use a head tilt as a shortcut to provide information to the user, without making the user go through layers of a user interface (UI). For example, if the user has a wirelessly controllable door lock, the user could set up a shortcut action to show the user if the door is locked or not. That is, when a head tilt exceeds a "threshold to check" (i.e. a threshold to learn whether the door in locked), a response may be provided on the HMD display or by some other indication, such as using audible feedback. The threshold to check may be associated with different devices of a smart home, where the device that is checked may be determined based upon where the user of the HMD device is looking for example.

Figure 14:
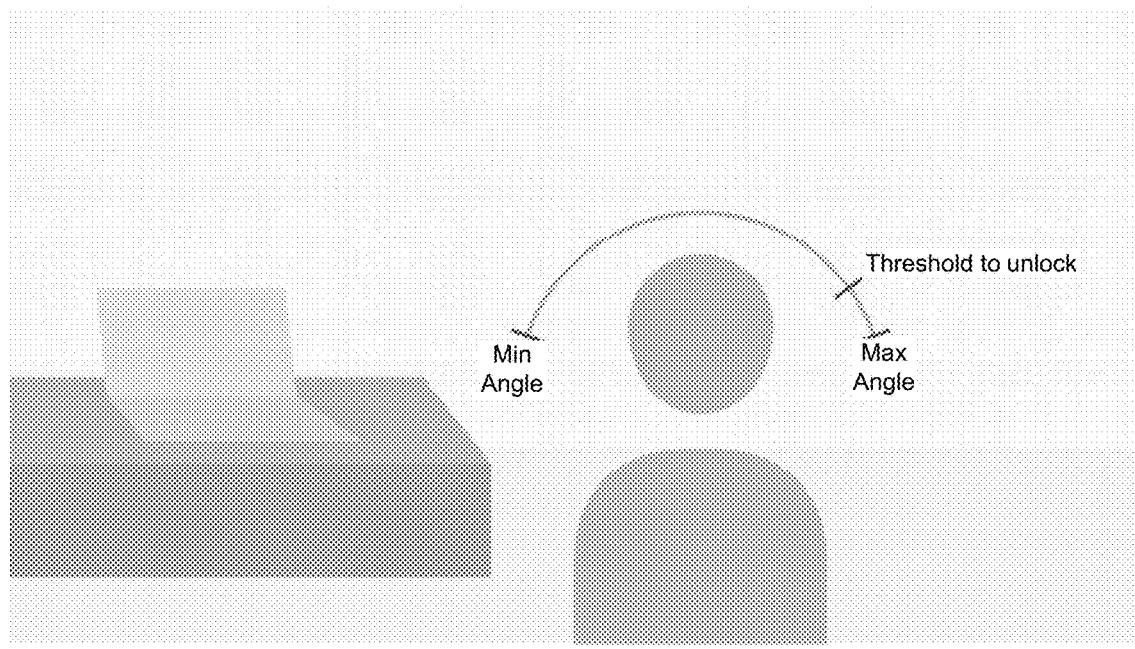
FIG. 14 illustrates another exemplary scenario where a connected device may be controlled based on a detected positional movement of a user.

FIG. 14 illustrates another exemplary scenario where a connected device may be controlled based on a detected positional movement of a user. In the example of FIG. 14, an HMD device may recognize a device, such as a user's laptop based on optical input (e.g., a camera) and allow a user to lock or unlock the laptop based on a tilt movement passing a threshold. For example, a head tilting to the right past a "threshold to unlock" may unlock the laptop. According to other implementations, a head tilting to the left past a "threshold to lock" to lock may lock the laptop.

Figure 15:
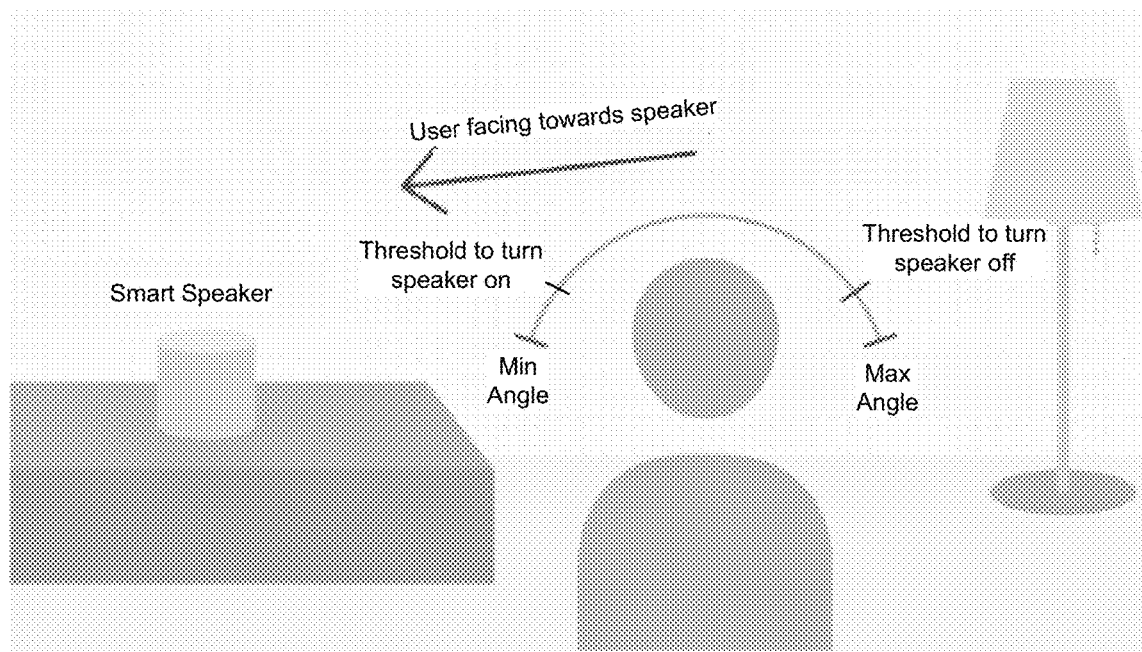
FIG. 15 illustrates an exemplary scenario where a device may be controlled based upon a direction that a user of an HMD device is facing.
Figure 16:
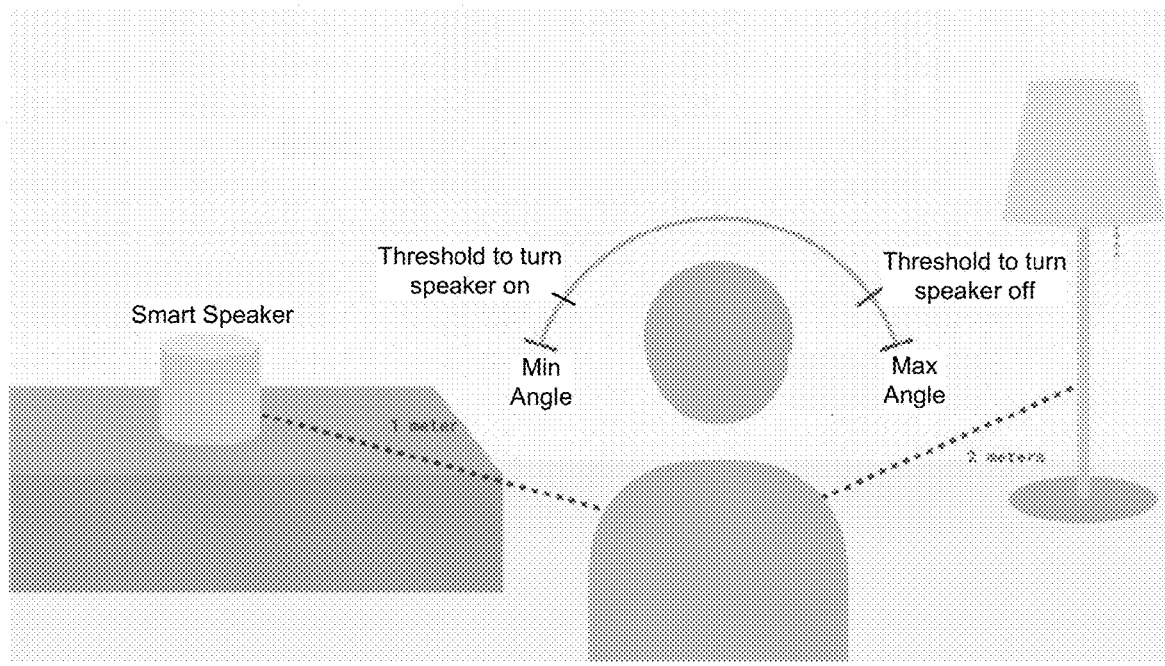
FIG. 16 illustrates an exemplary scenario where a device of a plurality of devices that may be controlled based upon a proximity of a user of an HMD device to the devices.

FIGS. 15 and 16 show examples where a device could be turned on or off or otherwise controlled based upon the direction of the user of the HMD device is facing or a proximity of the user to the controlled device. FIG. 15 illustrates an exemplary scenario where a device may be controlled based upon a direction that a user of an HMD device is facing. According to the example of FIG. 15, a user may have a speaker and a lamp that can be controlled by the HMD device. Accordingly, the HMD device would only send a control signal to a particular device, depending upon where the user of the HMD devices facing.

The determination for selecting a device to control could be achieved using different sensors of the HMD. According to a one method, a spatial map of locations of the user and virtual objects in a room can be maintained. The user may label different locations of the devices, such as IoT devices, in the spatial map. Once labeled, the HMD can calculate if the user's gaze is within a triggering threshold. If the user is gazing within the gaze triggering threshold and the user tilts their head past a tilt threshold, an event can be passed to the device within the gaze threshold. According to another method, a device could use image recognition to identify a previously identified external device that may be controlled. The HMD could then determine which device to control based upon the device that is closest to the center of view of a camera of the HMD.

Alternatively, according to the example of FIG. 16, a device of a plurality of external devices may be controlled based upon a proximity of a user of an HMD device to the external devices. As shown in FIG. 16, if the user is 1 meter from the smart speaker and is 2 meters from the lamp, the detected head motions are used to control the device that is closer. The distance from the HMD device to an external device can be detected by one or more sensors of the HMD device. For example, a virtual map using a camera or other sensors (generated by the user or via an object detection algorithm) could be generated based upon detected devices. If the control of a device is based upon distance to the device, the HMD can calculate the distance between the devices labeled in the spatial map and the user. Then, when the user tilts their head past the tilt threshold, the nearest device can be controlled. Image recognition can also be used in a distance based determination, where the relative sizes of the devices could be considered. For example, if one device is larger relative to other devices in a distance-based determination of FIG. 16, then the device that appears closer can be used. Whether using gaze-based control or distance based control, using image recognition requires the device to be within the camera's field of view. Alternatively, other sensor data could be used. For example, a receiver signal strength indicator (RSSI) signal from Bluetooth signal could be used. Such an arrangement of FIGS. 15 and 16 may be beneficial in an environment where multiple devices may be controlled by the user of the HMD device, such as in a smart home environment having multiple device that can be controlled.

Figure 17:
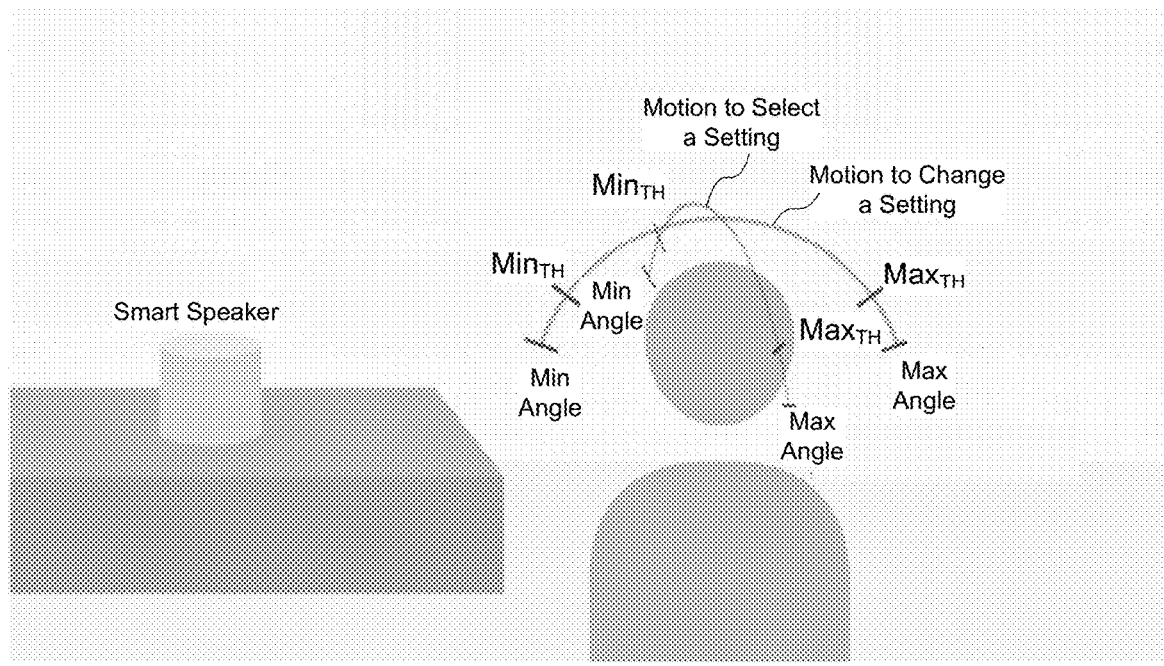
FIG. 17 illustrates an exemplary scenario where a user of an HMD device may toggle through settings of a device.
Figure 18:
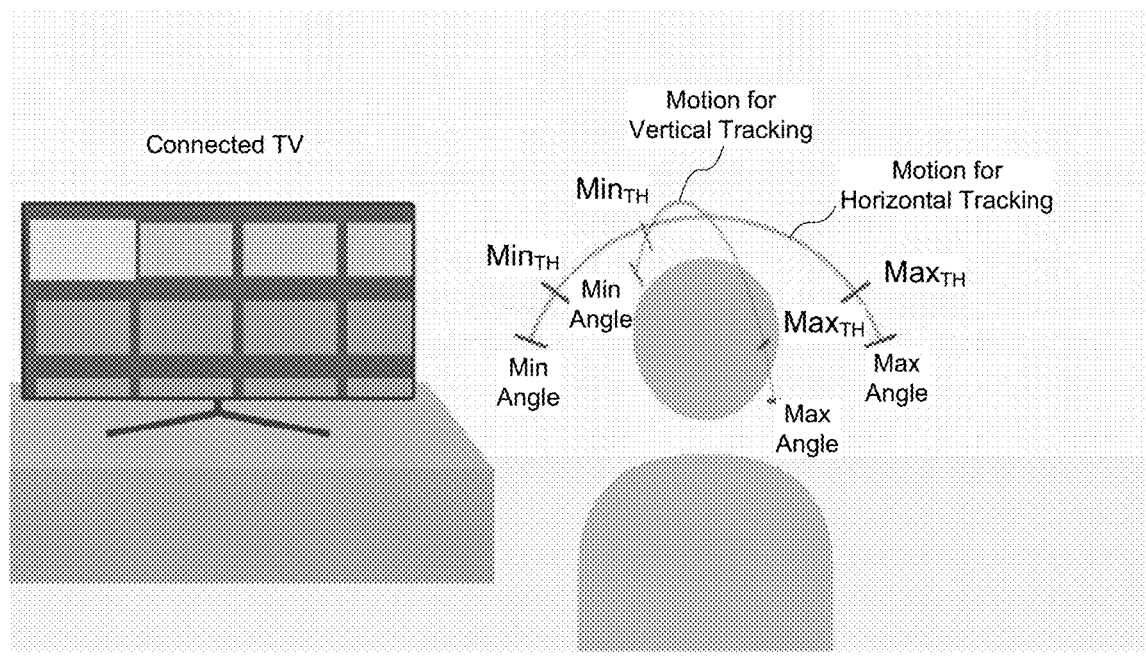
FIG. 18 illustrates an exemplary scenario where a user of an HMD device may navigate content of a TV grid menu.
Figure 19:
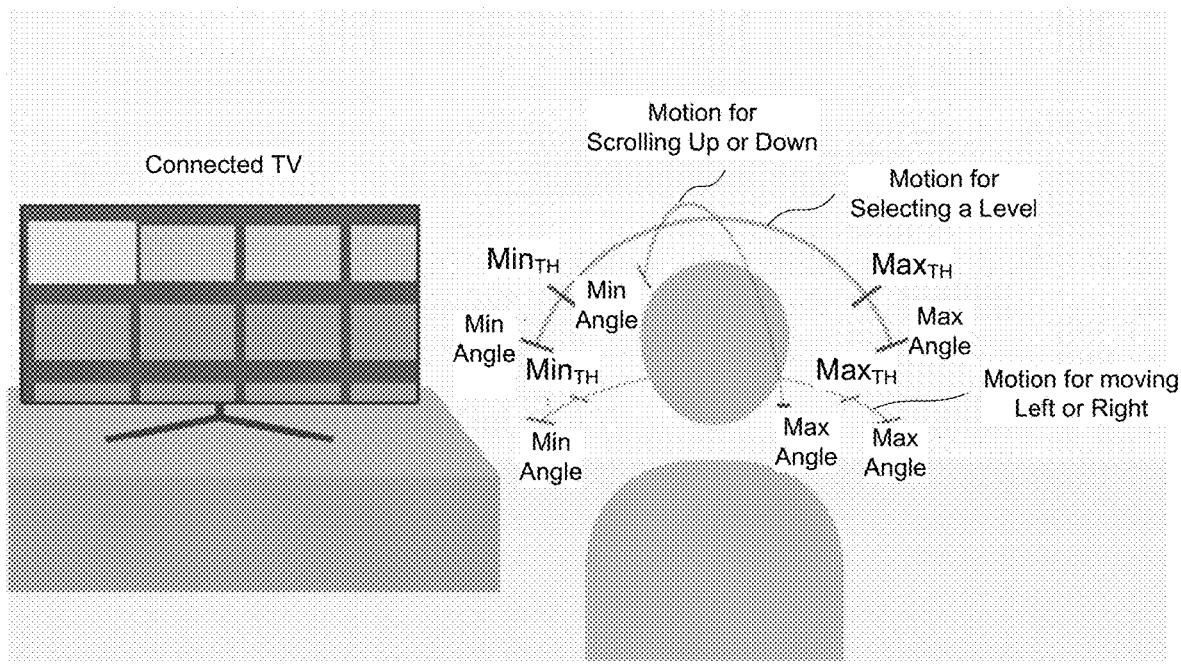
FIG. 19 illustrates an exemplary scenario where a user of an HMD device may use 3 rotational axis to navigate content.

FIGS. 17-19 show additional examples of multi-directional head motion to control a device. According to the example of FIG. 17, a user of an HMD device may toggle through settings of a device, such as using a head tilt on one axis to select a setting to be changed, and changing the setting value using a different axis. For example, a forward and backward head tilt could be used to select a particular setting of a plurality of settings that could be changed when a threshold is reached, and then a side-to-side head tilt could be used to change the selected setting (e.g. volume). The settings being changes and the selected values for the settings could be provided to the user by visual or audio feedback for example.

According to the example of FIG. 18, a user of an HMD device may navigate content of a TV grid menu for a connected TV, where forward and backward head tilting motions could be used for moving up and down in the grid and side-to-side head tilting could be used for moving from left to right in the grid. Minimum and maximum threshold values can be used moving from one row to another or from one column to another. According to another example of a connected TV as shown in FIG. 19, a user of an HMD device may use 3 rotational axis to navigate content, where the side-to side tilting could further be used for moving between levels. For example, one head motion (e.g. turning the head to the left or the right) could be used for moving a cursor through or enabling a selection of an image of a plurality of images in a row on the screen (e.g. programming options on a connected TV for example, where minimum and maximum threshold values can be used to scroll along a row). A second head motion, such as tilting the head to the left or right, could be used to select a level of programming. A third head motion (e.g. tilting the head forward and backward) can be used to scrolling up and down, where minimum and maximum thresholds can be used to scroll to different rows for example. The min and max values may be provided as guide paths associated with different head motions are provided in the examples of FIGS. 11-19 to enable a user to perform an action that is detected as an event by the HMD, allowing the HMD device to respond to the action.

Figure 21:
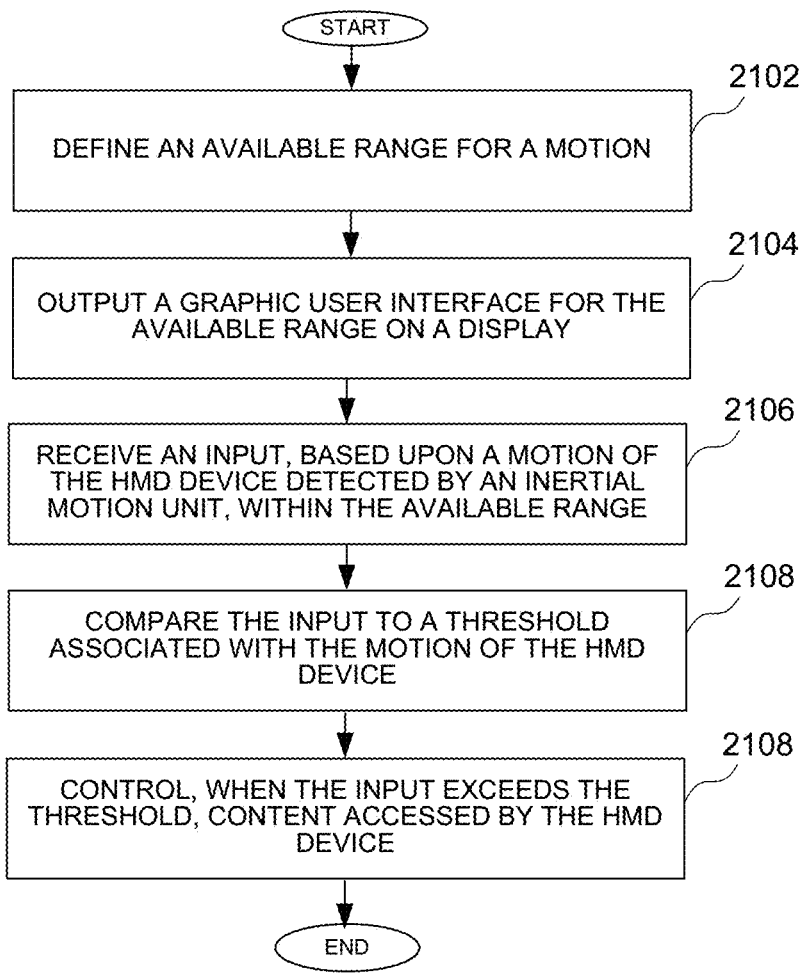
FIG. 21 is a flow chart showing a method of operating a head mounted display device.

FIGS. 20-21 describe methods of operating an HMD device, and can be implemented using any of the embodiments as described in FIGS. 1-19 for example, or other suitable devices and systems. FIG. 20-A is a flow chart showing a method of operating platform event handlers and application event handlers in response to the detection of an event. Sensors, such as the sensors 420 of FIG. 4, send raw data to an event detector at a block 2002. The event detector, such as the processor 410 of FIG. 4, can then determine if the sensor data matches defined events at a block 2004. It is then determined whether an event is detected in a step 2006. An event can be identified if sensor data from one or more sensors correspond to a sensor event definition stored in the memory 428 for example.

If an event is detected, it is determined whether the event is protected by the platform at a block 2008. That is, an event may be protected by the platform, where the platform does not make that event available to the developers of an app to use that detected event to generate a control signal in response to the detected event when running the app. If an event is not protected by the platform, the event is made available to applications in a block 2010.

An event may be protected by the platform of an HMD device for a variety of reasons. For example, the HMD may want to keep certain events exclusive to the platform, and may not make those events available to applications provided by developers that are independent of the platform. According to some embodiments, an application can register with the platform to receive particular semantic events. For example, an internet application developer could have an internet element monitor for an event called 'touchstart'. If the browser detects a user touching the screen, the platform may make all of the event listeners aware of the event. Alternatively, there may exist events which the platform wants to use but doesn't want to make accessible to developers. For example, when operating in a mobile phone application and the home button is pressed, the platform may enable a user to exit the app and go back to a home screen, while an application of a developer may not receive that 'homebuttondown' event. By way of another example, in a spatial computing head transformation context, a platform may utilize a 'headtiltleft' event for a platform function and not allow a developer to overwrite this event.

It is then determined whether an app uses the event at a block 2012. If the app does not use the event, no action is taken based upon the event and the process ends at a block 2014.

If it is determined that an app uses in event at the block 2012, it is determined whether user settings change default behavior at a block 2016. If not, an app event handler performs a default defined action at a block 2018. Otherwise, the app event handler performs a user defined action at a block 2020.

Because a protected event may only acted upon by the platform, events that are determined to be protected by the platform at the block 2008 are only acted on by the platform event handler in blocks 2022-2026. Therefore, if it is determined that an event is protected by the platform, it is then determined whether user settings change default behavior at a block 2022. If the user settings do not change default behavior, the platform event handler performs default defined actions at a block 2024. However, if the user settings do change default behavior, the platform event handler performs a user defined action at a block 2026.

FIG. 20-B is a flow chart showing a method performing discrete or continuous actions in response to the detection of an event. According to the flow chart of FIG. 20-B, after the platform event handler performs a default defined action at a block 2024, the platform event handler performs a user defined action at a block 2026, the app event handler performs a default defined action at a block 2018, or the app event handler performs a user defined action at a block 2020 (as described above in FIG. 20-A), it is determined whether the action is a discrete action or a continuous action at a block 2030. If the action is a discrete action, a single action or function is performed at a block 2032. A "discrete" action may be considered a stepped/quantized state, whereas "continuous" may be considered an analog state. To use the example of moving through years in FIGS. 7 and 8, a discrete implementation would provide an option to go to a particular year for example, where a user could select "next year" or "last year".

However, if the action is a continuous action, the HMD device starts monitoring the sensor to detect changes at a block 2034. The HMD device responds to sensor changes and events at a block 2036. For example, the HMD may take an action based upon a detected event based upon movements of the user. It is that determined whether the HMD device should stop monitoring sensor changes at a block 2038. If so, the HMD device stops monitoring sensor changes at a block 2040. Otherwise, the HMD device continues to monitor sensor changes at the block 2034.

A continuous implementation could enable the use of a slider, where a user could move continuously between two points and move to different locations in a range of years. For example, a user may see media within a range centered around the particular day that is closest to a scrubbed location.

FIG. 21 is a flow chart showing a method of operating a head mounted display device. An available range for a motion is defined at a block 2102. The available range may be defined as described above in reference to FIG. 5 for example. A graphic user interface for the available range is output on a display at a block 2104. For example, the graphic use interface may out a visual guide path for a movement to adjust a content as described above in reference to FIGS. 7-19 indication a motion that may be taken to change content for example. An input based upon a motion of the HMD device detected by an inertial motion unit, within the available range is received at a block 2106. According to some embodiments, minimum and maximum thresholds may be used to control an HMD device or an external device. For example, the input may be compared to a threshold associated with the motion of the HMD device, such as the minimum and maximum thresholds as described above, at a block 2108. When the input exceeds the threshold, content accessed by the HMD device is controlled at a block 2110.

The method may further comprise determining an optimal range for a gesture-based control of an external device. According to some embodiments, the content accessed by the HMD device may comprise at least one of content provided on the display or provided by an external device. Receiving an input, based upon a motion of the HMD device detected by the inertial motion unit, within the available range may comprise detecting at least one of a lateral head movement, a longitudinal head movement, a vertical head movement, or a rotational head movement. Outputting a graphic user interface may comprise outputting a visual guide path for a movement to adjust the content. The method may further comprise outputting to the display an indicator of a location within at least one of audio or video content. Controlling content accessed by the HMD device may comprise implementing at least one of an adjustment of time of an event within the content or a changing of a playback location within at least one of audio content or video content.

It should be noted that the illustrated regions of the figures are merely examples. Also, it should be noted that although the above illustrations are shown in two dimensions, the zones are often three dimensional. It also should be noted that for clarity and ease of illustration, the figures are not necessarily made to scale.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Though embodiments have been described with reference to certain versions thereof; however, other versions are possible. Therefore, the spirit and scope of the embodiments should not be limited to the description of the preferred versions contained herein.

The invention claimed is:

1. A head mounted display (HMD) device comprising:
a motion detector;
a display;
a processor coupled to the motion detector and the display;
a memory coupled to the processor, wherein the memory stores executable instructions that cause the processor to:
define an available range for a motion of the HMD device to control an application running on the HMD device, wherein the range for the motion extends from a minimum value to a maximum value;
output a graphic user interface for the available range on the display;
receive an input, based upon a motion of the HMD device detected by the motion detector, within the available range; and
control one of the HMD device or an external device in response to the input.

2. The HMD device of claim 1, wherein the memory further stores instructions to compare the input to a threshold associated with the motion of the HMD device and control the HMD device or the external device when the input exceeds the threshold.

3. The HMD device of claim 1, wherein controlling the HMD device or an external device comprises controlling content provided on the display or provided by an external device.

4. The HMD device of claim 1, wherein the motion of the HMD device comprises at least one of a lateral head movement, a longitudinal head movement, a vertical head movement, or a rotational head movement.

5. The HMD device of claim 1, wherein outputting a graphic user interface comprises outputting a visual guide path for a movement to control one of the HMD device or the external device.

6. The HMD device of claim 1, wherein the memory further stores instructions to output to the display an indicator of a location within at least one of audio or video content.

7. The HMD device of claim 3, wherein controlling the content comprises implementing at least one of an adjustment of time of an event within content or a changing of a playback location within at least one of audio content or video content.

8. The HMD device of claim 1, wherein controlling the HMD device comprises displaying content at an identified static position in the real world.

9. The HMD device of claim 1, wherein controlling the HMD device comprises displaying content at a static position relative to the HMD.

10. A method of operating a head mounted display (HMD) device comprising:
defining an available range for a motion of the HMD device to control an application running on the HMD device, wherein the range for the motion extends from a minimum value to a maximum value;
outputting a graphic user interface for the available range on a display;
receiving an input, based upon a motion of the HMD device detected by a motion detector, within the available range; and
controlling one of the HMD device or an external device in response to the input.

11. The method of claim 10, further comprising comparing the input to a threshold associated with the motion of the HMD device and controlling the HMD device or an external device when the input exceeds the threshold.

12. The method of claim 10, wherein controlling the HMD device or the external device comprises controlling content provided on the display of the HMD device or controlling the external device.

13. The method of claim 10, wherein receiving an input, based upon a motion of the HMD device detected by the motion detector, within the available range comprises detecting at least one of a lateral head movement, a longitudinal head movement, a vertical head movement, or a rotational head movement.

14. The method of claim 10, wherein outputting a graphic user interface comprises outputting a visual guide path for a movement to control one of the HMD device or an external device.

15. The method of claim 10, further comprising outputting to the display an indicator of a location within at least one of audio or video content.

16. The method of claim 10, wherein controlling one of the HMD device or the external device comprises implementing at least one of an adjustment of time of an event within content or a changing of a playback location within at least one of audio content or video content.

17. A non-transitory computer-readable storage medium having data stored therein representing instructions executable by a processor to perform a method of operating a head mounted display (HMD) device comprising:
defining an available range for a motion of the HMD device to control an application running on the HMD device, wherein the range for the motion extends from a minimum value to a maximum value;

outputting a graphic user interface for the available range on a display;

receiving an input, based upon a motion of the HMD device detected by a motion detector, within the available range; and controlling one of the HMD device or an external device in response to the input.

18. The non-transitory computer-readable storage medium of claim 17, wherein controlling one of the HMD device or an external device comprises comparing the input to a threshold associated with the motion of the HMD device and controlling the HMD device or the external device when the input exceeds the threshold.

19. The non-transitory computer-readable storage medium of claim 17, wherein receiving an input, based upon a motion of the HMD device detected by the motion detector, within the available range comprises detecting at least one of a lateral head movement, a longitudinal head movement, a vertical head movement, or a rotational head movement.

20. The non-transitory computer-readable storage medium of claim 17, wherein controlling one of the HMD device or an external device comprises implementing at least one of an adjustment of time of an event within content or a changing of a playback location within at least one of audio content or video content.

\* \* \* \* \*